(12) United States Patent
Komiya et al.

(10) Patent No.: US 10,625,785 B2
(45) Date of Patent: Apr. 21, 2020

(54) FRONT SUB-FRAME STRUCTURE

(71) Applicant: MAZDA MOTOR CORPORATION, Hiroshima (JP)

(72) Inventors: Katsuyuki Komiya, Hiroshima (JP); Masaaki Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 36 days.

(21) Appl. No.: 15/762,672

(22) PCT Filed: Nov. 1, 2016

(86) PCT No.: PCT/JP2016/082474
§ 371 (c)(1),
(2) Date: Mar. 23, 2018

(87) PCT Pub. No.: WO2017/082123
PCT Pub. Date: May 18, 2017

(65) Prior Publication Data
US 2018/0265135 A1 Sep. 20, 2018

(30) Foreign Application Priority Data
Nov. 11, 2015 (JP) .................... 2015-221129

(51) Int. Cl.
*B62D 21/15* (2006.01)
*B62D 21/11* (2006.01)
(Continued)

(52) U.S. Cl.
CPC ............ *B62D 21/155* (2013.01); *B60R 19/34* (2013.01); *B62D 21/06* (2013.01); *B62D 21/11* (2013.01)

(58) Field of Classification Search
CPC ...... B62D 21/155; B62D 21/06; B62D 21/11; B60R 19/34
See application file for complete search history.

(56) References Cited

U.S. PATENT DOCUMENTS

| 9,120,507 B1 * | 9/2015 | Alwan ................. B62D 21/152 |
| 2005/0212334 A1 * | 9/2005 | Murata ................ B62D 21/11 |
| | | 296/204 |

(Continued)

FOREIGN PATENT DOCUMENTS

| CN | 1673008 A | 9/2005 |
| CN | 100447032 C | 12/2008 |

(Continued)

OTHER PUBLICATIONS

International Search Report issued in PCT/JP2016/082474; dated Dec. 6, 2016.

*Primary Examiner* — Darlene P Condra
(74) *Attorney, Agent, or Firm* — Studebaker & Brackett PC

(57) ABSTRACT

In the front part of the front sub-frame (5), provided are a sub-crash can attachment part (12) and a tension rod supporting part (14); a front vehicle body attachment part (13) is provided between the two parts; the sus-cross member (73) is provided in the front vehicle body attachment part (13) and the tension rod supporting part (14); the front-side vehicle body attaching portion (13) includes a sub crash can load transmitting member (30); and the upper face portion (21) of the front vehicle body attachment part (13) and the partition wall (33) of the sub-crash can load transferring member (30) are spaced apart in the vertical direction and extend in the longitudinal direction of the vehicle.

3 Claims, 12 Drawing Sheets

(51) Int. Cl.
  *B62D 21/06*   (2006.01)
  *B60R 19/34*   (2006.01)

(56) References Cited

U.S. PATENT DOCUMENTS

| | | | | |
|---|---|---|---|---|
| 2011/0095568 | A1* | 4/2011 | Terada | B62D 25/088 |
| | | | | 296/187.09 |
| 2011/0233947 | A1* | 9/2011 | Baccouche | B60R 19/34 |
| | | | | 293/133 |
| 2012/0175916 | A1* | 7/2012 | Rawlinson | B62D 21/152 |
| | | | | 296/203.02 |
| 2012/0181803 | A1* | 7/2012 | Snell | B62D 21/152 |
| | | | | 293/133 |
| 2013/0241166 | A1 | 9/2013 | Paintmayer et al. | |
| 2013/0257028 | A1* | 10/2013 | Kuwabara | B62D 21/155 |
| | | | | 280/784 |
| 2014/0291056 | A1* | 10/2014 | Takanaga | B60K 11/085 |
| | | | | 180/274 |
| 2015/0084375 | A1* | 3/2015 | Asano | B62D 21/11 |
| | | | | 296/187.09 |

FOREIGN PATENT DOCUMENTS

| | | |
|---|---|---|
| DE | 10 2009 004 310 A1 | 7/2010 |
| JP | H9-086437 A | 3/1997 |
| JP | 2012-061918 A | 3/2012 |
| WO | 2012001934 A1 | 1/2012 |

* cited by examiner

FRONT SUB-FRAME STRUCTURE

TECHNICAL FIELD

The technique disclosed in this application relates to a front sub-frame structure disposed below a front side frame.

BACKGROUND ART

A typically-known front sub-frame includes a front part having a sub-crash can attachment part, a tension rod supporting part, and a cross member extending in the vehicle width direction so as to face the tension rod supporting part from the inside in the vehicle width direction.

Examples of such a front sub-frame include a configuration in which a crush can (1e) is supported by a tension rod supporting part (2) as illustrated in Patent Document 1, and a front sub-frame structure including a steering rack (7) disposed below the tension rod supporting part (1a) in addition to a tension rod supporting part (1a) and a cross member (2) as shown in Patent Document 2.

Such a front sub-frame needs to include a sub-crash can in as low a position as possible to lower the position of a load (such as a front collision load) receiving point.

In addition, the steering rack, which is disposed at substantially the same height as the front sub-frame, needs to be disposed below the side member extending to the rear side of the tension rod supporting part. To satisfy such needs, a known front sub-frame includes a structure in which a front sub-frame is disposed so as to be offset upward with respect to the position of the sub-crush can. However, in such a structure, the load transmission path from the front to the rear of the front sub-frame is displaced in the vertical direction at the time of, e.g., a front collision.

Thus, even the front sub-frame in which the load transmission path is displaced in the vertical direction as described above needs to have a secured load transmission efficiency to the rear at the time of, e.g., a front collision and have an improved support stiffness of the tension rod and attachment stiffness of the sub-crash can.

CITATION LIST

Patent Documents

Patent Document 1: United States Patent Application Publication No. 2013/0241166
Patent Document 2: German Patent Invention No. 102009004310

SUMMARY

Technical Problem

The front part of the front sub-frame is provided with the tension rod supporting part and the sub-crash can attachment part, and thus the structure thereof is likely to be complicated. Thus, it is disadvantageous to form such a complicated structure from the view point of formability (e.g., an increased cost).

Thus, it is conceivable to form the front part of the front sub-frame with a plate material or the like in order to improve the formability and the assembling property of the front part of the front sub-frame. However, even if the front part of the front sub-frame is formed with a plate material or the like so that the formability is improved, it is difficult to secure the support stiffness of the tension rod and the attaching stiffness of the sub-crash can, and it is difficult to secure both the formability of the front sub-frame at the front part of the front sub-frame and the secured tension rod support stiffness and sub-crash can attaching stiffness.

Both Patent Documents 1 and 2 do not disclose the objects of improving the formability of the front part of the front sub-frame and improving the stiffness, and also do not disclose the technical idea that the front part of the front sub-frame is formed with a plate member. Thus, there was a room for further study.

Thus, the technique disclosed in this specification aims to form the front part of the front sub-frame with a plate material such as a steel plate and also increase the supporting stiffness of the tension rod and the attachment stiffness of the sub-crash can.

Solution to the Problem

The front sub-frame structure of the technique disclosed in this specification is directed to an automobile front sub-frame structure including a pair of left and right front side frames extending from a cabin front face toward a vehicle front, and a front sub-frame disposed below the front side frame and supporting a front suspension device, wherein in a front part of the front sub-frame, provided are a sub-crash can attachment part disposed so as to face the sub-crash can from a rear, and a substantially U-shaped tension rod supporting part extending in an outwardly rear direction in a vehicle width direction; a front vehicle body attachment part is provided between the two parts; a cross member facing the front vehicle body attachment part and the tension rod supporting part from an inside in the vehicle width direction is provided; the front vehicle body attachment part includes a sub-crash can load transferring member installed between a rear face of the sub-crash can attachment part and a front face of the tension rod supporting part; and an upper wall of the front vehicle body attachment part and an upper wall of the sub-crash can load transferring member are spaced apart and extend in a longitudinal direction of the vehicle.

According to the above configuration, the front vehicle body attachment part and the sub-crash can load transferring member on the front part of the front sub-frame can be formed with a plate material such as a steel plate. Thus, the formability (assembling property) can be secured and the cost and weight can be reduced. In addition, the upper wall of the front vehicle body attachment part and the upper wall of the sub-crash can load transferring member are spaced apart and extend in a longitudinal direction of the vehicle such that the supporting stiffness of the tension rod and the attaching stiffness of the sub-crush can can be increased.

According to the above configuration, the front vehicle body attachment part and the sub-crash can load transferring member on the front part of the front sub-frame can be formed with a plate material such as a steel plate, and the upper wall of the front vehicle body attachment part and the upper wall of the sub-crash can load transferring member are spaced apart and extend in a longitudinal direction of the vehicle. Thus, the weight of the front sub-frame can be reduced, whereas the support rigidity of the tension rod and the mounting rigidity of the sub-crash can can be increased.

Further, the structure in which the upper wall of the front vehicle body attachment part and the upper wall of the sub-crash can load transferring member are spaced apart and extend in a longitudinal direction of the vehicle is provided by taking advantage of the space generated between the tension rod supporting part provided so as to face toward the outwardly rear direction in the vehicle width direction and the sub-crash can. Thus, the front part of the front sub-frame can be reinforced, and a compact layout with that space can be provided.

In addition, the front vehicle body attachment part is provided by taking advantage of the space generated between the tension rod supporting part provided so as to face toward the outwardly rear direction in the vehicle width direction and the sub-crash can. Thus, the front vehicle body attachment part can compactly face the sus-cross member in the vehicle width direction and the sub-crush can in the longitudinal direction.

Preferably, the sub-crash can load transferring member has a bottom opening shape and includes at least a partition wall vertically dividing an inner space of the front vehicle body attachment part, and an outer face disposed outside in the vehicle width direction, and the partition wall and the outer face are arranged along an outer shell of the sub-crash can, and the outer face includes a service hole.

According to the above configuration, both the assembling property of the front vehicle body attachment part and the sub-crash can load transferring member and the efficiency of load distribution toward the vehicle body (the front side frame) and the tension rod supporting part (the front sub-frame) can be improved.

Preferably, a recess, which is opened downward, for storing a steering rack and a stabilizer is formed on a rear side of the tension rod supporting part and under a side member.

According to the above configuration, both a compact space for disposing the tension rod, the stabilizer, the steering rack and the like and the assembling property of the stabilizer toward the rear of the tension rod supporting part can be achieved.

Advantages of the Invention

According to the technique disclosed in this specification, it is possible to form the front part of the front sub-frame with a plate material such as a steel plate and also increase the supporting stiffness of the tension rod and the attachment stiffness of the sub-crash can.

DESCRIPTION OF EMBODIMENTS

An embodiment will be described hereinafter with reference to the drawings.

FIGS. 1 through 7 illustrate a front sub-frame structure of an automobile of this embodiment.

Figure 1:
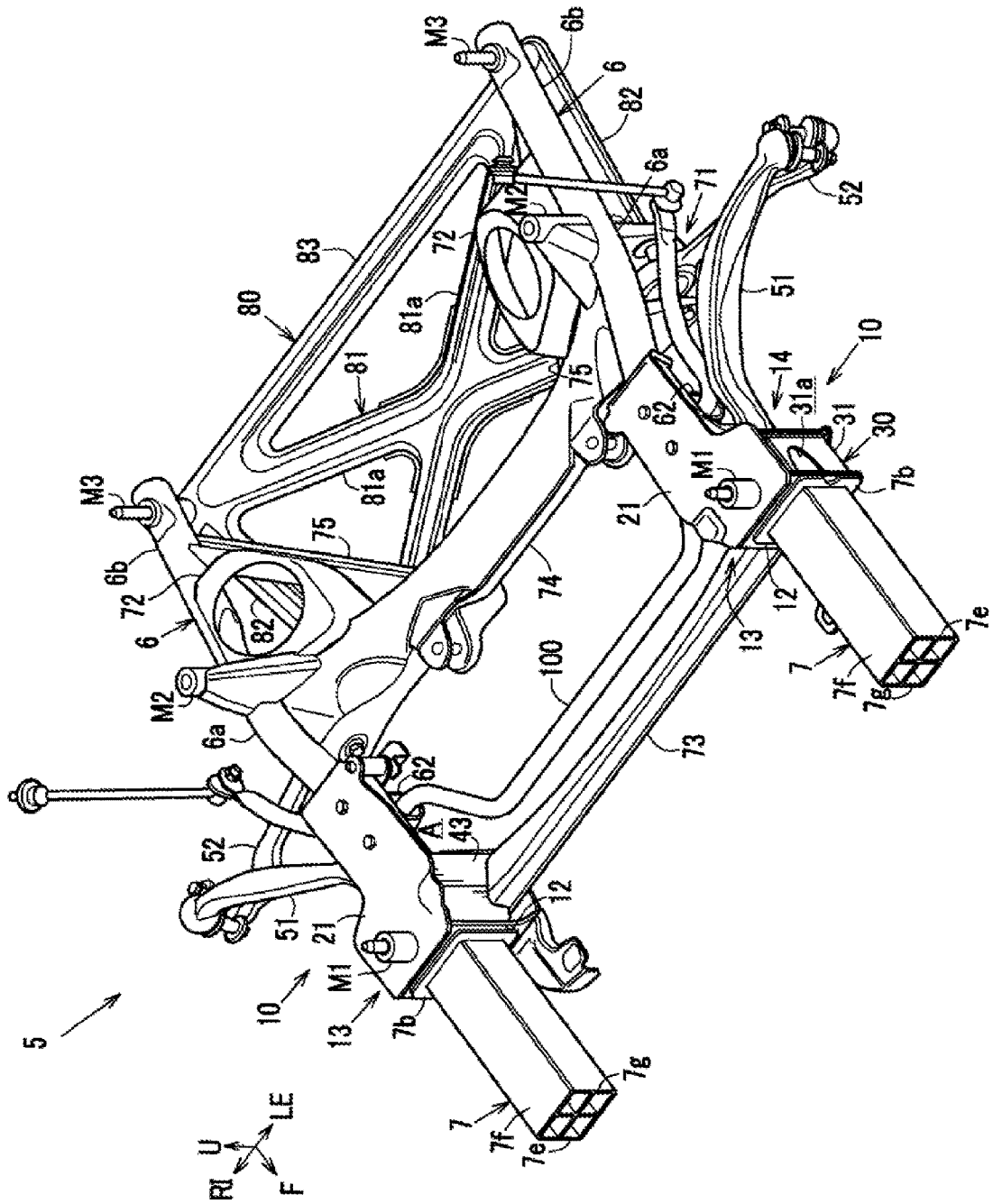
FIG. 1 is a perspective view of a front sub-frame of a vehicle according to an embodiment.
Figure 7:
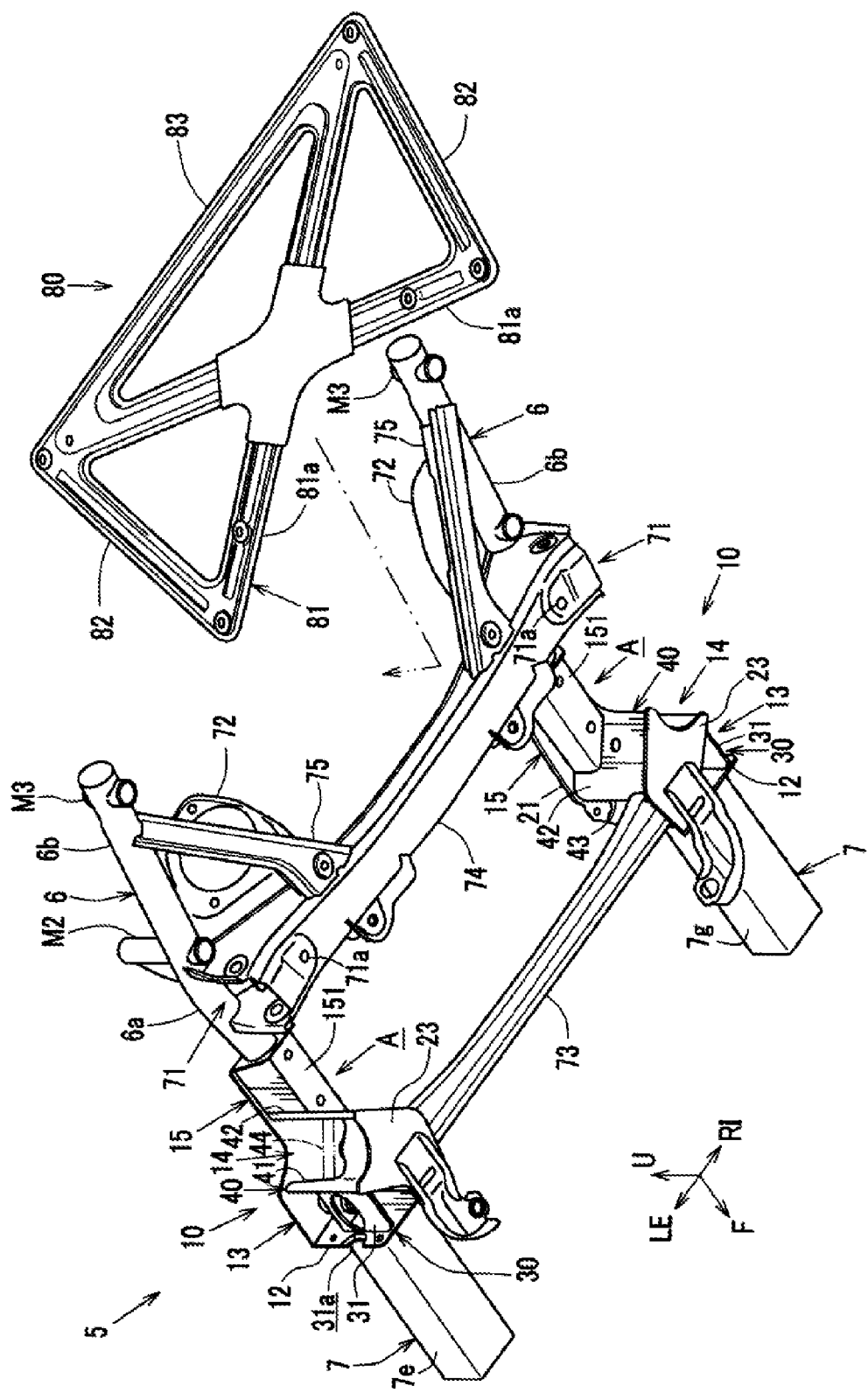
FIG. 7 is an illustration of a configuration of a brace of the front sub-frame.

In particular, FIG. 1 is a perspective view of a front sub-frame of the vehicle according to this embodiment when viewed downward from an obliquely left front portion. FIG. 7 is a disassembled perspective view of a brace and the front sub-frame from which the brace is detached, when viewed from below.

Figure 2:
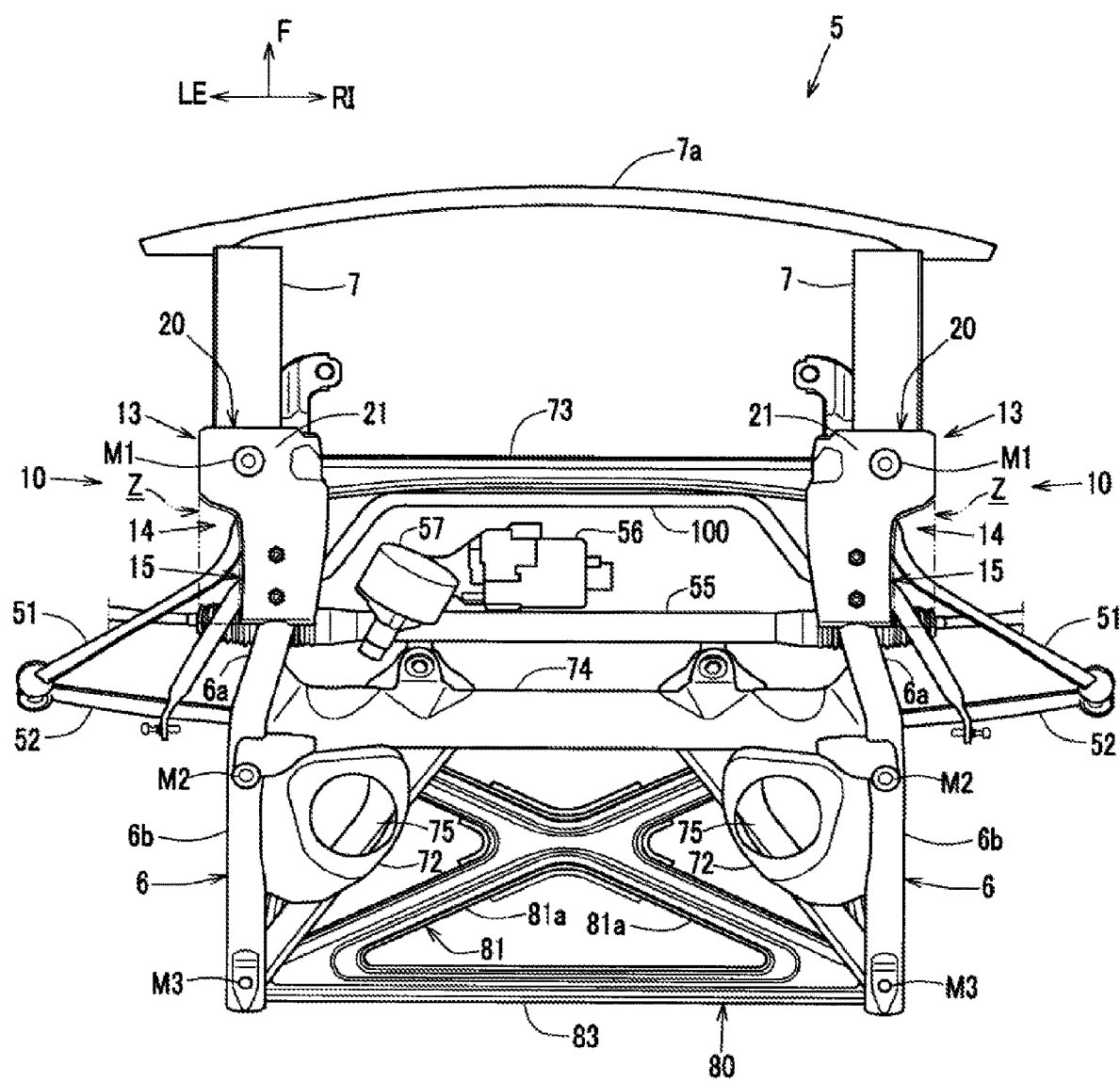
FIG. 2 is a plan view of the front sub-frame.
Figure 4:
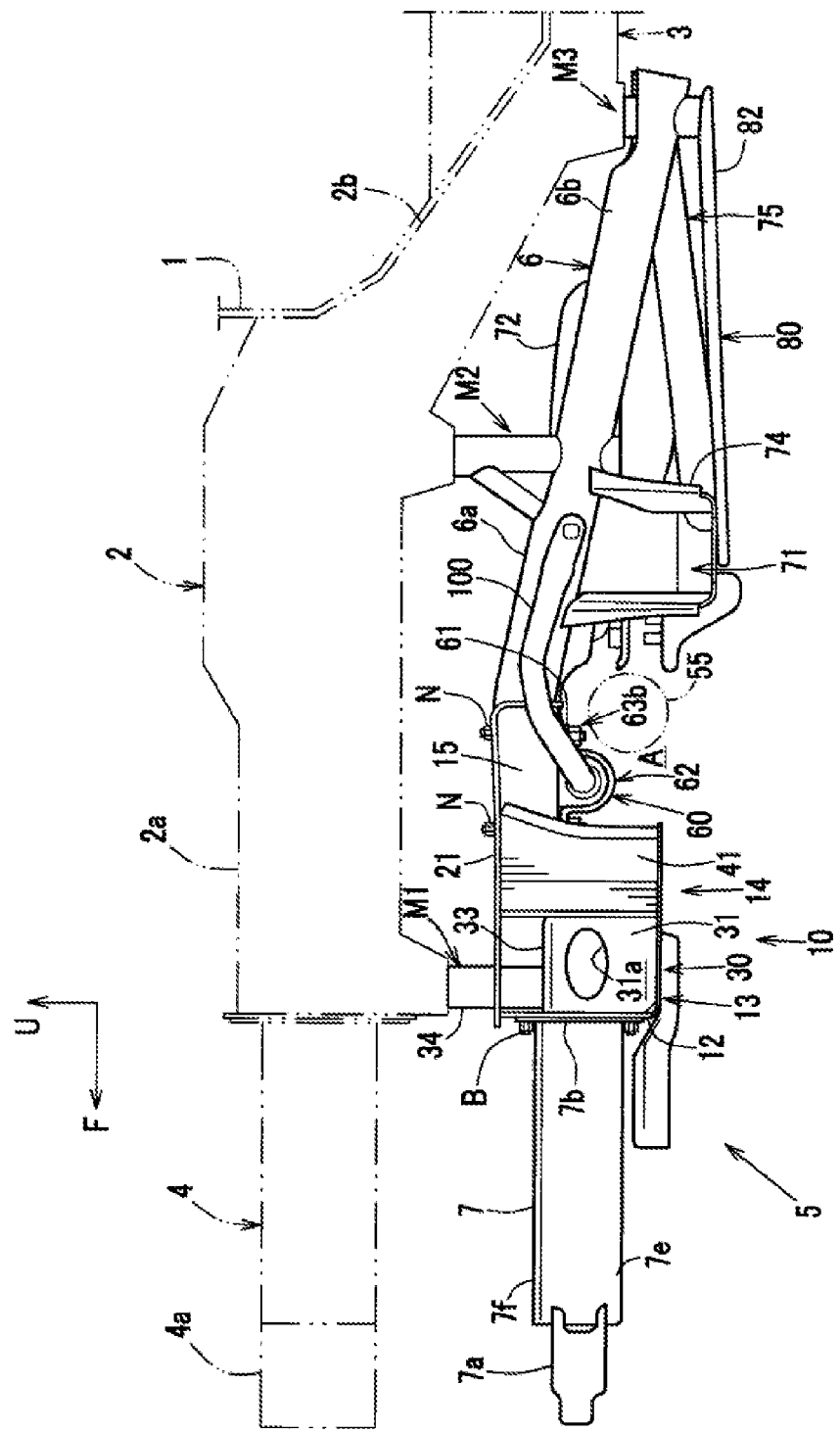
FIG. 4 is a left side view of the front sub-frame.
Figure 5:
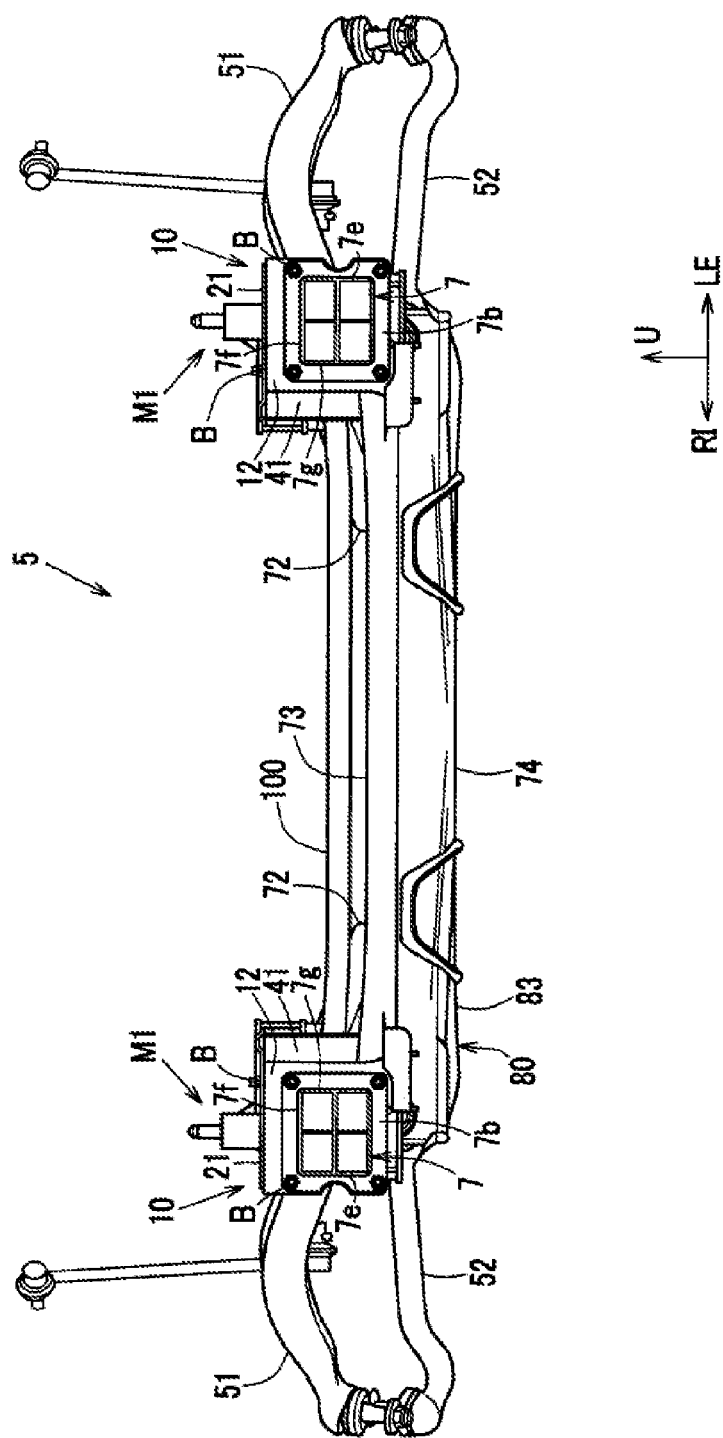
FIG. 5 is a front view of the front sub-frame.
Figure 6:
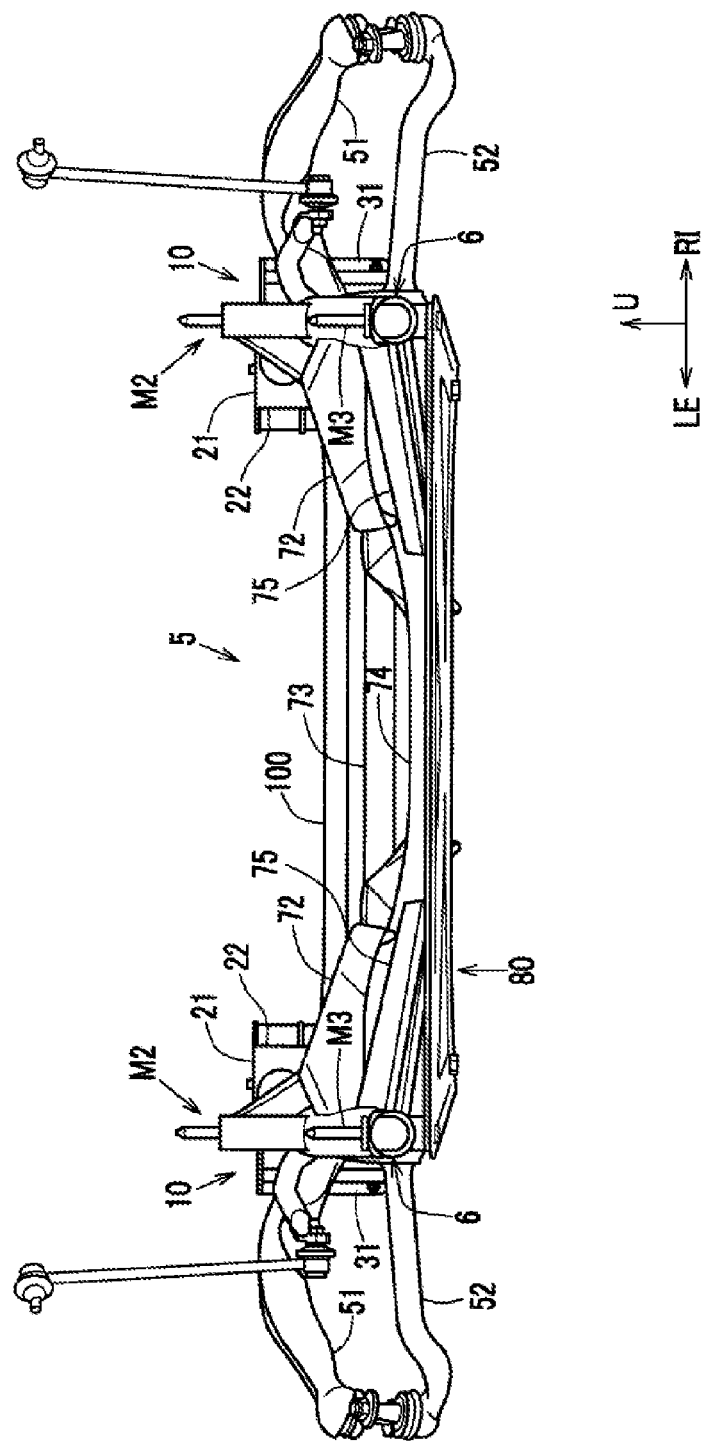
FIG. 6 is a rear view of the front sub-frame.
Figure 8:
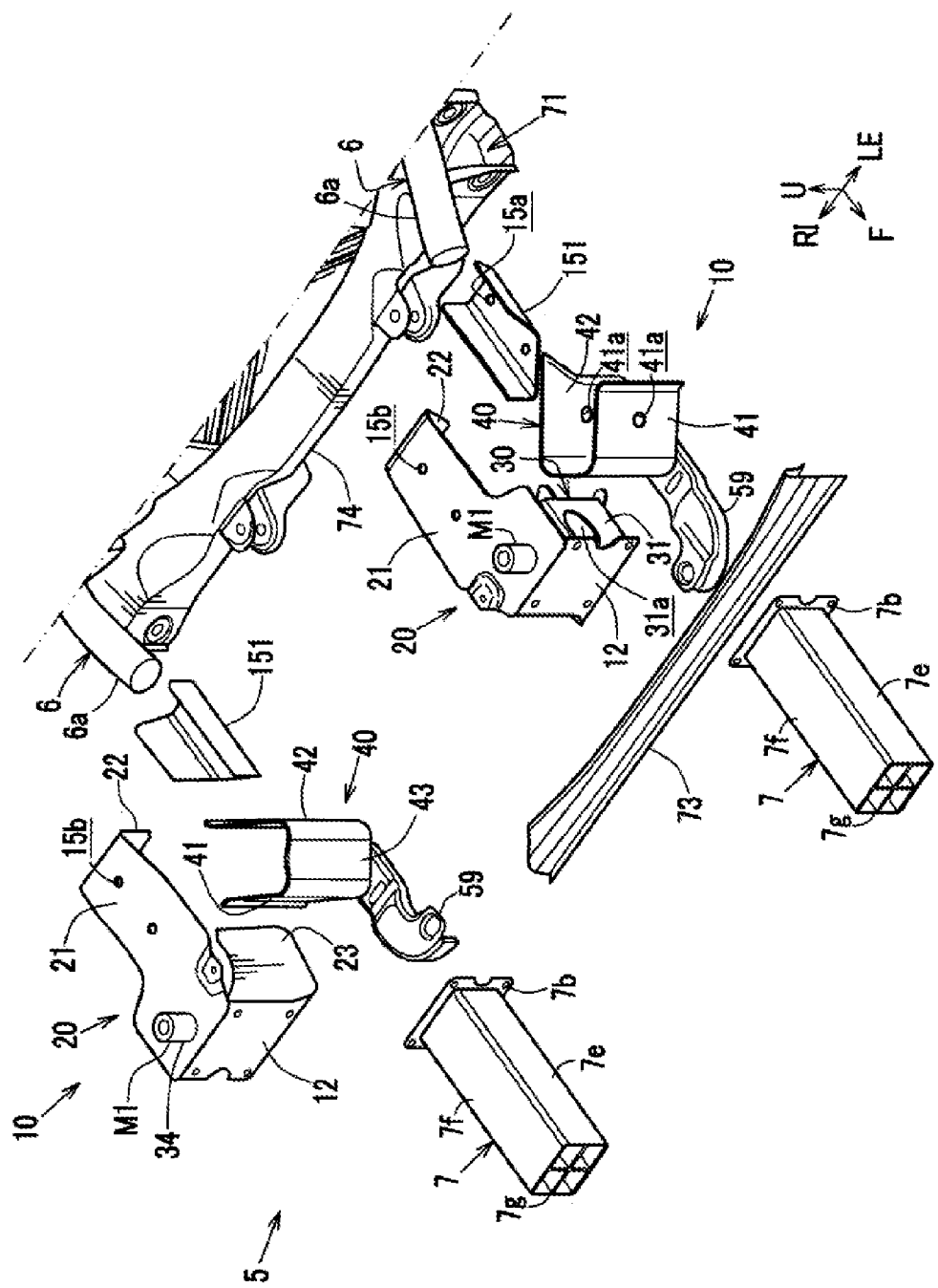
FIG. 8 is a disassembled perspective view of a front portion of the front sub-frame.

In the drawings concerning this embodiment except FIG. 2, a steering rack 55, a power steering actuator (a power steering motor) 56, and a power steering pinion 57 are not shown. FIG. 4 does not show tension rods 51 and lower arms 52. FIGS. 5 and 6 do not show a sub-bumper reinforcement 7a. FIGS. 7 and 8 described later do not show a stabilizer support part 62 and a stabilizer 100, in addition to the sub-bumper reinforcement 7a, the tension rods 51, and the lower arms 52. In addition, in the drawings concerning the following embodiment, arrow F represents the vehicle front, arrow LE represents the left in the vehicle width direction, arrow RI represents the right in the vehicle width direction, and arrow U represents upward of the vehicle.

As illustrated in FIG. 4, a front portion of the automobile includes a dash panel 1 disposed at a front face of a cabin and a pair of left and right front side frames 2 and 2 (only left one of which is shown) extending forward from a lower portion of the dash panel 1. Below the front side frame 2, as illustrated in FIGS. 1 through 6, a front sub-frame 5, for a front suspension device of a slat type, supporting the lower arms 52 (lateral rods) (see FIGS. 1 and 2) substantially horizontally extending outward in the vehicle width direction and the tension rods 51 (see the same drawings) extending from ahead of the lower arms 52 to the rear and extending outward in the vehicle width direction are disposed.

Each of the front side frames 2 according to this embodiment includes a horizontal portion 2a extending substantially horizontally along the vehicle longitudinal direction (longitudinal direction) in side view and a kick-up portion 2b (tilt portion) extending and declining rearward from the rear end of the horizontal portion 2a along the lower end of the dash panel 1. A floor frame 3 extending rearward in the vehicle is connected to the rear end of the kick-up portion 2b (see FIG. 4). The front end of the front side frame 2 is provided with a metal crash can 4 constituted by, for example, a cylindrical body projecting forward in the vehicle. A bumper reinforcement 4a extending in the vehicle width direction is attached to the front end face of the crash can 4.

As illustrated in FIGS. 1 through 7, the front sub-frame 5 mainly includes: a pair of left and right side members 6 and 6 extending in the vehicle longitudinal direction (longitudinal direction); sub-crash cans 7 extending forward of the side members 6; a sub-frame front structure 10 (coupling member) coupling the side members 6 and the sub-crash cans 7 to each other in the longitudinal direction and constituting a front portion of the front sub-frame 5; a sus-cross member 73 (hereinafter referred to as a "sus-cross member 73") extending in the vehicle width direction to couple the pair of left and right sub-frame front structures 10 and 10; a rear cross member 74 extending in the vehicle width direction to couple the pair of left and right side members 6 and 6 to each other; a tilt member 75 coupled to the members 6 and 6, and 74 behind the rear cross member 74 between the pair of side members 6 and 6; and a brace 80.

As illustrated in FIGS. 1, 2, and 4, mount parts M1, M2, and M3 (e.g., mount bushes and a mount pipe 34) each projecting upward are coupled to the front sub-frame 5 at three points at each of the left and right sides, that is, a front portion of the sub-frame front structure 10, a longitudinally intermediate portion of the side member 6, and the rear end of the side member 6. Specifically, the first mount part M1 (front vehicle body attachment part), the second mount part M2, and the third mount part M3 (rear vehicle body attachment part) are arranged in this order from the front to the rear.

As illustrated in FIG. 4, the first mount part M1 is coupled to the front end of the horizontal portion 2a of the front side frame 2 of the vehicle body, the second mount part M2 is coupled to a rear portion of the horizontal portion 2a, and the third mount part M3 is coupled to the front end of the floor frame 3 (as portion connected to the kick-up portion 2b).

In the manner described above, the front sub-frame 5 is mounted on the vehicle body at three points on one side in the longitudinal direction, that is, at six points in total on both lateral sides, and is disposed under the vehicle body.

Figure 3:
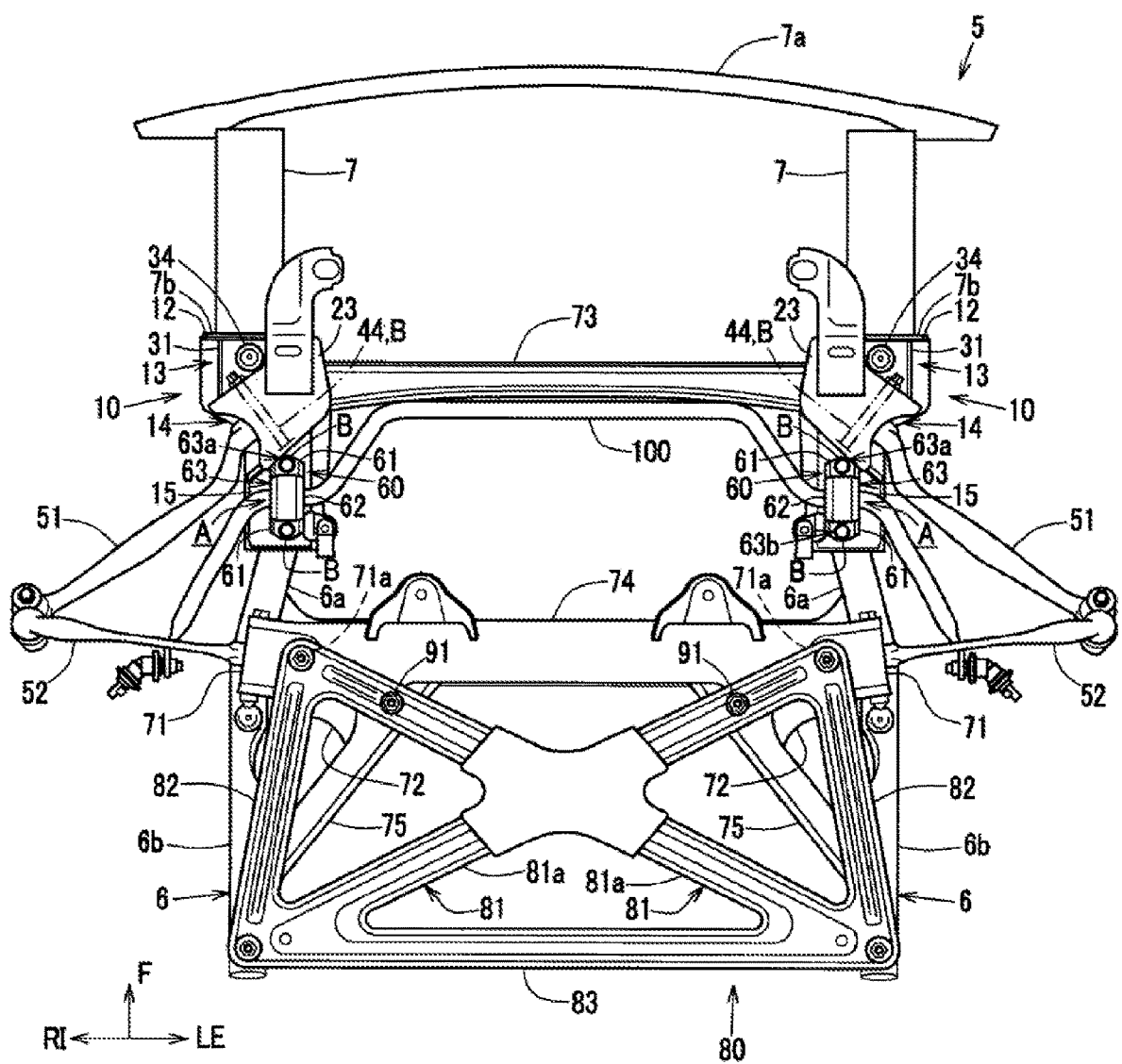
FIG. 3 is a bottom view of the front sub-frame.

The sub-crash cans 7 are impact energy absorbing members similar to the crash cans 4 at the front ends of the front side frames 2. As illustrated in FIGS. 2 through 4, a sub-bumper reinforcement 7a extending in the vehicle width direction are attached to the front ends of the sub-crash cans 7 and couples the front ends of the left and right sub-crash cans 7 to each other.

As illustrated in FIG. 4, the side members 6 are bridged below the pair of left and right front side frames 2 and the floor frame 3, and as illustrated in FIGS. 1 through 4 and 7, extend longitudinally in a rounded pipe shape. Each of the side members 6 includes a side member front portion 6a disposed ahead of the second mount part M2 in the longitudinal direction of the side member 6 and a side member rear portion 6b disposed behind the second mount part M2 in the longitudinal direction of the side member 6 (not shown).

Both the side member front portions 6a and the side member rear portions 6b decline rearward in side view (see FIG. 4). More specifically, the side member front portions 6a tilt outward in the vehicle width direction in plan view from the front end toward the second mount part M2 (see FIGS. 2 and 3), and the left and right side member rear portions 6b extend in parallel in the longitudinal direction in plan view (see the same drawings).

As illustrated in FIGS. 1 through 5 and 7, the sub-frame front structure 10 includes sub-crash can attachment parts 12, front vehicle body attachment parts 13, tension rod supporting parts 14, and closed-section coupling parts 15 interposed between the sub-crash cans 7 and the side members 6, arranged in this order from the front to the rear, and serving as set plates for attaching rear brackets (rear flanges) 7b of the sub-crash cans 7.

In other words, as illustrated in FIGS. 8 through 12, the sub-frame front structure 10 is constituted by assembling a plurality of panel members in a three-dimensional shape, and includes sub-frame front structure bodies 20, tension rod supporting brackets 40, and closed-section forming panels 151.

Figure 9A:
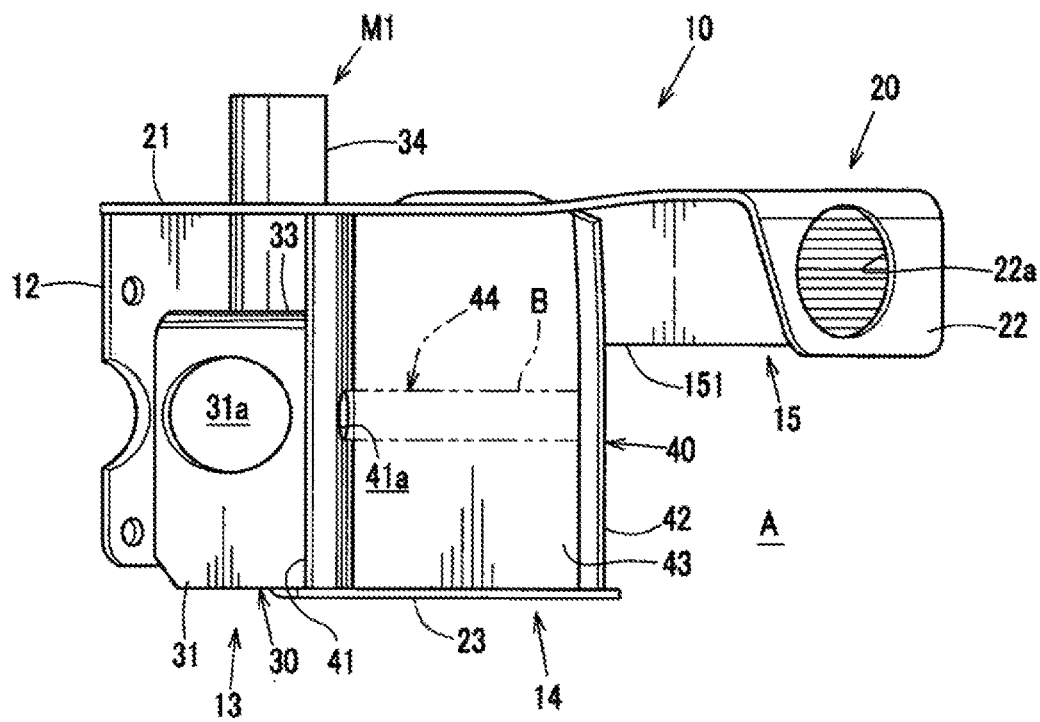
FIG. 9A is an illustration of a configuration of a front structure of the sub-frame.
Figure 9B:
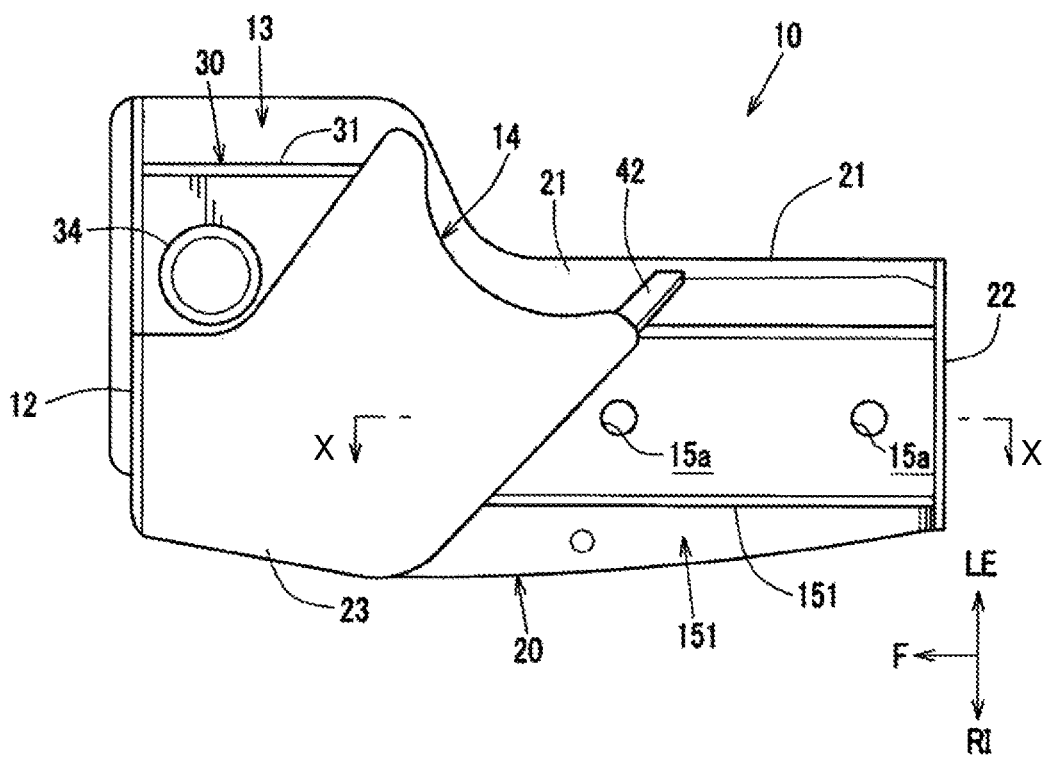
FIG. 9B is an illustration of the configuration of the front structure of the sub-frame.
Figure 10:
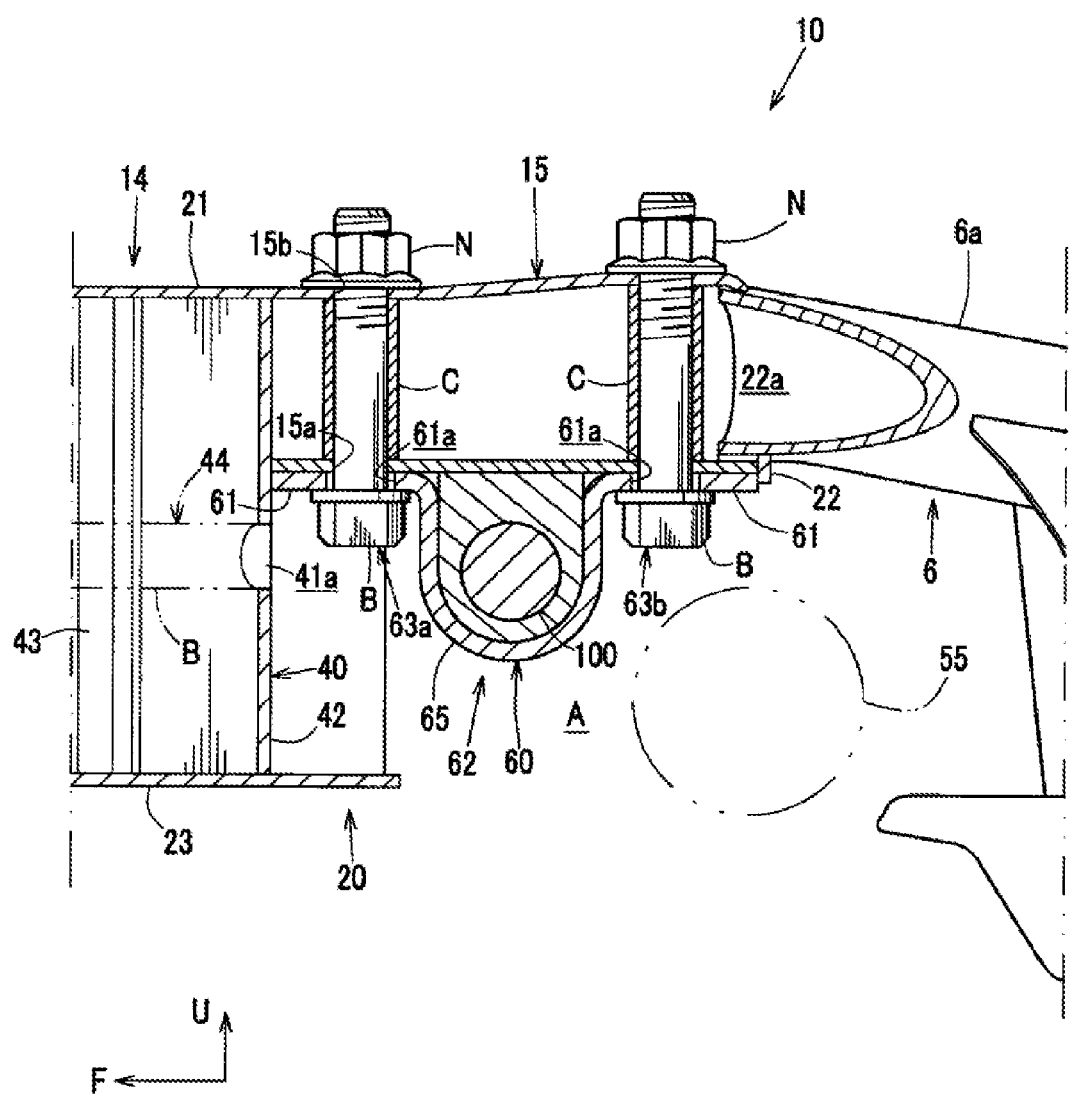
FIG. 10 is an illustration of a structure for fastening a stabilizer to the closed-section coupling part.
Figure 11A:
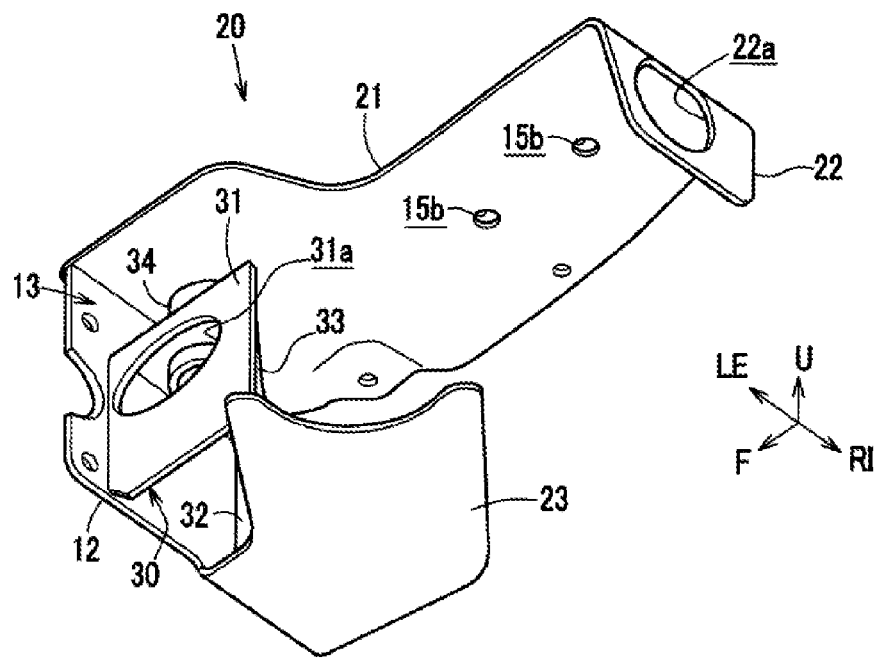
FIG. 11A is an illustration of the configuration of a body of the front structure of the sub-frame.
Figure 11B:
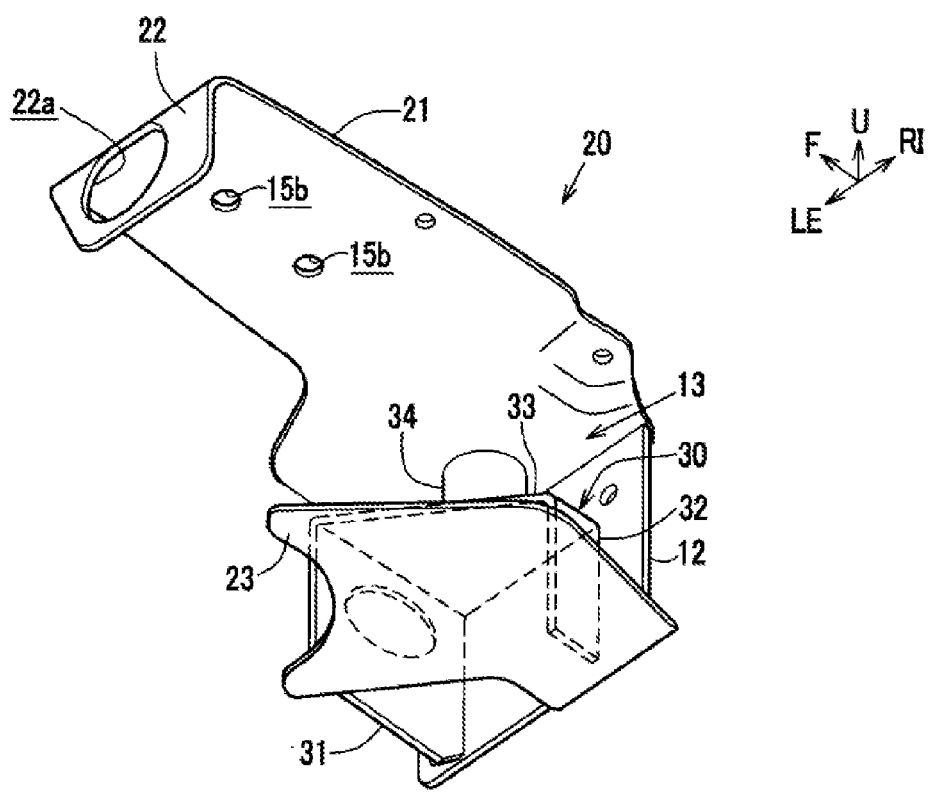
FIG. 11B is an illustration of the configuration of the body of the front structure of the sub-frame.
Figure 12A:
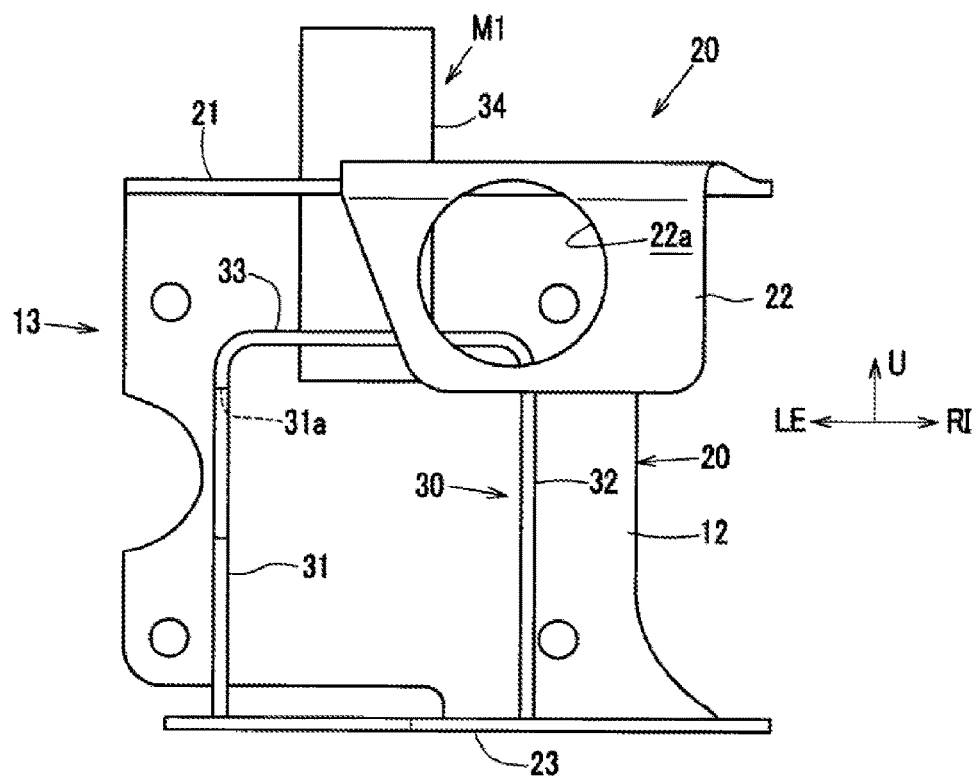
FIG. 12A is an illustration of the configuration of a body of the front structure of the sub-frame.
Figure 12B:
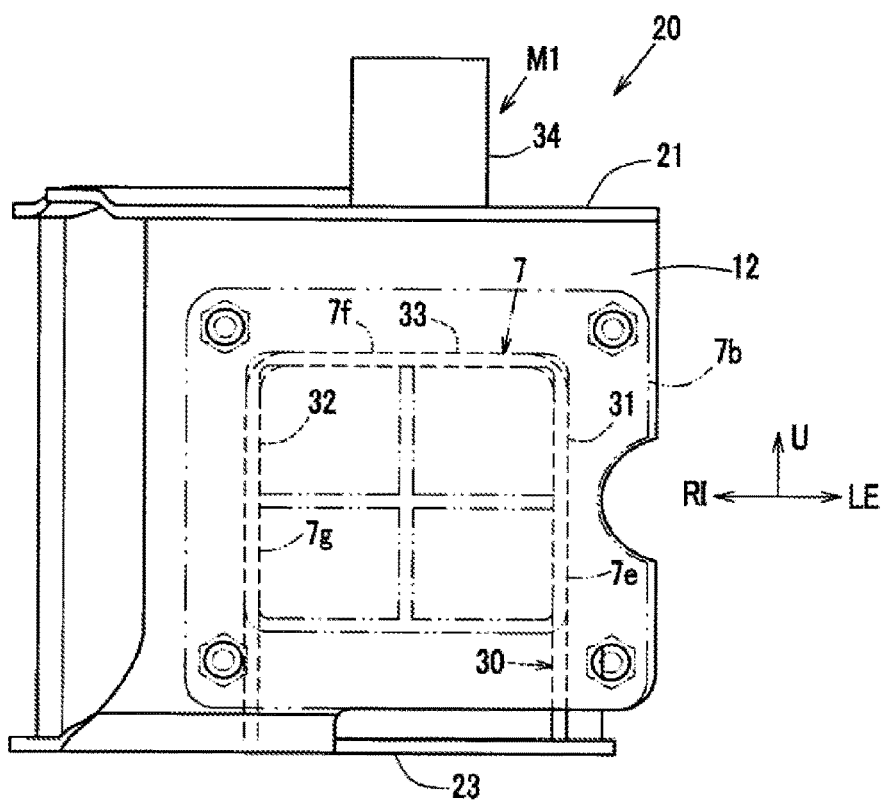
FIG. 12B is an illustration of the configuration of the body of the front structure of the sub-frame.

FIG. 8 is a disassembled perspective view of a front portion of the front sub-frame, especially the sub-frame front structure. Reference numeral 59 in FIG. 8 denotes a radiator supporting bracket. FIG. 9A is a perspective view of the left sub-frame front structure when viewed from an obliquely left rear portion at an angle of 45 degrees. FIG. 9B is a bottom view of the sub-frame front structure. FIG. 10 is an enlarged sectional view of a portion corresponding to line X-X in the front sub-frame in FIG. 9B. FIG. 11A is a perspective view of a body of the left sub-frame front structure when viewed from an obliquely left bottom portion. FIG. 11B is a perspective view of a body of the sub-frame front structure when viewed from an obliquely right rear bottom portion. FIG. 12A is a back view of the body of the sub-frame front structure. FIG. 12B is a front view of the body of the sub-frame front structure.

Each of the sub-frame front structure bodies 20 includes an upper face portion 21 having a length corresponding to the length of the sub-frame front structure 10 in the longitudinal direction, a rear face portion 22 bending downward from the rear end of the upper face portion 21 and having a protruding shape, a sub-crash can attachment part 12 which corresponds to the front face of the sub-frame front structure 10 and to which the rear bracket 7b of the sub-crash can 7 is attached, and a bottom face portion 23 (see the same drawings).

As illustrated in FIGS. 1, 2, 7, 8, 9B, 11A, and 11B, the upper face portion 21 has an outer portion, in the vehicle width direction, of a portion corresponding to the tension rod supporting part 14 in the longitudinal direction gradually decreasing inward in the vehicle width direction toward, and the outer portion in the vehicle width direction is notched inward in the vehicle width direction so that a portion corresponding to the closed-section coupling part 15 extends rearward with the substantially same width.

As illustrated in FIGS. 9A, 10, 11A, 11B, and 12A, the rear face portion 22 corresponds to the rear face of the closed-section coupling part 15, has a circular opening 22a in which a front portion of the side member 6 is inserted, and is formed as a side member joint face that is joined and fixed with the front end of the side member 6 inserted in the opening 22a.

As illustrated in FIGS. 4, 5, 8, 11A, 11B, 12A, and 12B, the sub-crash can attachment part 12 corresponds to the front face of the sub-frame front structure 10, and is formed as a set plate having a substantially rectangular shape in front view larger than the rear bracket 7b at the rear end of the sub-crash can 7.

The rear bracket 7b at the rear end of the sub-crash can 7 faces the sub-crash can attachment part 12, and as illustrated in FIGS. 4 and 5, the sub-crash can 7 is fastened and fixed with a bolt B and a nut (not shown), for example, and is coupled to the sub-frame front structure 10.

As illustrated in FIGS. 7, 8, 9B, 11A, and 11B, the bottom face portion 23 protrudes rearward on the lower face of the sub-frame front structure 10 to form a later-described bottom face of the tension rod supporting part 14 from the lower end portion of the sub-crash can attachment part 12, and then extends obliquely rearward and inward in the vehicle width direction.

In addition, as illustrated in FIGS. 4, 7, 8, 9A, 11A, 11B, and 12A, the sub-frame front structure body 20 includes a sub-crash can load transferring member 30 below the upper face portion 21 in a portion corresponding to the front vehicle body attachment part 13 described later. The sub-crash can load transferring member 30 has an outer face 31, an inner face 32, and a partition wall 33 that form an arch shape (a U shape) that is open downward in cross section taken orthogonally to the longitudinal direction (see FIG. 12A). The sub-crash can load transferring member 30 is bridged between the rear face of the sub-crash can attachment part 12 and a front wall face 41 of the tension rod supporting part 14 (see FIGS. 4, 7, and 9A).

The outer face 31 of the sub-crash can load transferring member 30 is disposed on the outer side in the vehicle width direction of the front vehicle body attachment part 13 of the sub-frame front structure 10, and has a width corresponding to the length between the sub-crash can attachment part 12 and the front wall face 41 of the tension rod supporting part 14 in the longitudinal direction on the outer side in the vehicle width direction of the front vehicle body attachment part 13. The inner face 32 of the sub-crash can load transferring member 30 is disposed on the inner side in the vehicle width direction of the front vehicle body attachment part 13 so as to face the outer face 31 in the vehicle width direction, and has a width corresponding to the length between the sub-crash can attachment part 12 and the front wall face 41 of the tension rod supporting part 14 in the longitudinal direction on the inner side in the vehicle width direction of the front vehicle body attachment part 13.

That is, as illustrated in FIGS. 11A and 11B, the inner face 32 of the sub-crash can load transferring member 30 is formed to be smaller in width than the outer face 31. As illustrated in FIGS. 1, 4, 7, 8, 9A, and 11A, an elliptical service hole 31a (a working through hole) having a major axis in the longitudinal direction is formed.

As illustrated in FIG. 12A, the partition wall 33 corresponds to the upper face of the sub-crash can load transferring member 30, is formed to couple, in the vehicle width direction, the upper ends of the outer face 31 and the inner face 32 supporting each other in the vehicle width direction, faces the upper face portion 21 of the sub-frame front structure 10 from below the upper face portion 21, and partitions internal space of the front vehicle body attachment part 13 into upper and lower parts. That is, the front vehicle body attachment part 13 does not have a bottom face and is open at the bottom, and the upper face portion 21 and the partition wall 33 constitute a structure, i.e., a so-called two-storied structure, separated vertically and extending in the longitudinal direction of the vehicle.

The partition wall 33 has a trapezoidal shape in plan view, where the length in the longitudinal direction is short toward the inside of the vehicle width direction so that the rear end side of the partition wall 33 abuts against the front wall face 41 of the tension rod supporting part 14 arranged toward the outside in the vehicle width direction (see FIG. 11B).

Here, as illustrated in FIG. 12B, the partition wall 33, the outer face 31, and the inner face 32 of the sub-crash can load transferring member 30 are disposed along the outer shell of the sub-crash can 7.

Specifically, the partition wall 33, the outer face 31, and the inner face 32 of the sub-crash can load transferring member 30 are flush with an upper face 7f, an outer face 7e, and an inner face 7g of the sub-crash can 7 through a rear bracket 7b of the sub-crash can 7 and the sub-crash can attachment part 12 along the longitudinal direction (see the same figure).

As illustrated in FIGS. 1 through 5, 9A, 11A, 11B, 12A, and 12B, the front vehicle body attachment part 13 (a so-called "protruding member") in the sub-frame front structure 10 is provided with the mount pipe 34 communicating in the vertical direction (top-bottom direction) in center portions of the upper face portion 21 and the partition wall 33 in plan view and standing and extending in a tower shape upward from the upper face portion 21, and constitutes the first mount part M1.

In addition, as illustrated in FIG. 8, each of the tension rod supporting brackets 40 has a front wall face 41 and a rear wall face 42 each extends rearward at the outer side in the vehicle width direction and a laterally inner wall face 43 coupling the laterally inner front ends of the front and rear wall faces 41 and 42 toward laterally inner rear portions. The front wall face 41, the rear wall face 42, and the laterally inner wall face 43 form a substantially U shape (a Japanese character "コ") in plan view that is open rearward and outward in the vehicle width direction. The tension rod supporting bracket 40 is interposed between the upper face portion 21 and the bottom face portion 23 of the sub-frame front structure body 20 (see also FIGS. 1, 4, 7, 9A, and 9B).

As illustrated in FIGS. 8, 9A, and 10, the front wall face 41 and the rear wall face 42 of the tension rod supporting bracket 40 include opposed tension rod supporting holes 41a. A bolt B bridged between the pair of tension rod supporting holes 41a and 41a and a nut (not shown) for fastening the bolt B constitute a tension rod supporting shaft 44 for pivotally supporting a proximal end of the tension rod 51. The tension rod supporting bracket 40 including the tension rod supporting shaft 44 is formed as the tension rod supporting part 14 (see FIG. 9A).

In addition, as illustrated in FIGS. 1 through 3 and 7, the lateral ends of the sus-cross member 73 described above are coupled to the lateral inner faces of the laterally inner wall faces 43 in the tension rod supporting parts 14.

As illustrated in FIG. 8, the closed-section forming panel 151 has a hat shape that is open upward in a cross section orthogonal to the longitudinal direction. As illustrated in FIGS. 7, 9A, and 9B, the closed-section forming panel 151 is joined to the lower face of a rear portion of the upper face portion 21 of the sub-frame front structure body 20 to thereby constitute the closed-section coupling part 15 having a closed cross section extending in the longitudinal direction.

In addition, as illustrated in FIGS. 3, 4, 7, 9A, and 10, a recess A that is opened downward for arranging the steering rack 55, for example, is formed behind the tension rod supporting part 14 and below the closed-section coupling part 15.

As illustrated in FIGS. 1 through 6, the stabilizer 100 is disposed and extends in the vehicle width direction along the laterally inner wall face 43 of the tension rod supporting part 14 and the sus-cross member 73.

Specifically, the stabilizer 100 extends substantially horizontally in the vehicle width direction near a portion behind the sus-cross member 73, and the lateral ends of the stabilizer 100 extend with a tilt rearward and outward in the vehicle width direction across and below the closed-section coupling part 15 in plan view. A portion of the stabilizer 100 below and across the closed-section coupling part 15 extends horizontally in the vehicle width direction to pass over the recess A below the closed-section coupling part 15 (see FIGS. 3 and 4).

As well known, the stabilizer 100 is used to reduce a roll angle in a bump or a rebound of only one wheel caused by resistance of torsional stiffness.

As illustrated in FIGS. 1, 3, 4, and 10, the stabilizer 100 described above is fastened and fixed to the lower face of the closed-section coupling part 15 with a stabilizer attaching bracket 60 holding the stabilizer 100, a bolt B, a nut N, and a collar C. In this manner, the stabilizer attaching bracket 60 holding the stabilizer 100 constitutes the stabilizer support part 62, and the stabilizer support part 62 is disposed in the recess A.

Specifically, as illustrated in FIG. 10, the stabilizer attaching bracket 60 includes a bracket main body part 65 formed in a substantially U shape, a pair of flanges 61 and 61 protruding in directions away from each other from the opening end part thereof, and a through hole 61a is formed in each of the pair of flanges 61 and 61.

On the upper and lower faces of the closed-section coupling part 15, through holes 15a and 15b as stabilizer support holes are formed. The through hole 61a is formed in the pair of flanges 61 and 61. The through holes 15a and 15b communicate with the through hole 61a in the vertical direction in a state in which the pair of flanges 61 and 61 are arranged in the front and rear sides of the lower face of the closed-section coupling part 15 (see FIG. 10).

The stabilizer 100 is fastened by the lower face of the closed-section coupling part 15 as follows. That is, in a state in which the stabilizer 100 is held by the bracket main body part 65, the pair of flanges 61 and 61 are disposed on the front and rear sides of the lower face of the closed-section coupling part 15 so that the through hole 61a formed in the front and rear flanges 61, and the through holes 15a and 15b formed in the upper and lower faces of the closed-section coupling part 15 communicate with each other.

Further, the bolt B is inserted between the through hole 61a of the flange 61, the through hole 15a on the lower face of the closed-section coupling part 15, the collar C erected in the internal space of the closed-section coupling part 15, the through hole 15b on the upper face of the closed-section coupling part 15 in this order from the lower side to the upper side, and a protruding part protruding from the through hole 15b formed on the upper face of the closed-section coupling part 15 is fastened with the nut N.

Thus, the stabilizer support part 62 is disposed in the recess A (see FIGS. 3, 4 and 10), and, as illustrated in FIGS. 3 and 10, on the lower face of the closed-section coupling part 15, stabilizer fastening parts 63a, 63b (a front stabilizer fastening part 63a and a rear stabilizer fastening part 63b) are arranged in parallel in the longitudinal direction through the stabilizer support part 62.

Accordingly, as illustrated in FIGS. 3 and 7, the tension rod support shaft 44 (the pair of tension rod supporting holes 41a, 41a), the stabilizer fastening parts 63a, 63b (the through holes 15a, 15b as the stabilizer support holes), and the side member 6 are arranged in the longitudinal direction in series.

As illustrated in FIGS. 1, 3, 4, 7, and 8, joint portions of the rear cross member 74 to the side members 6 and 6 at both ends in the vehicle width direction are provided with arm supporting parts 71 supporting the proximal ends of the lower arms 52 in such a manner that the lower arms 52 extending outward in the vehicle width direction can be pivotally supported in the vertical direction in order to determine the position of the front wheels in the vehicle width direction. That is, the left and right side members 6 and 6 support the lower arms 52 through the rear cross member 74.

In addition, as illustrated in FIGS. 1, 4, 6, and 7, a pair of left and right tilt members 75 is disposed behind the front sub-frame 5. The distance between the tilt members 75 and 75 in the vehicle width direction gradually increases toward the rear in plan view (i.e., the tilt members 75 and 75 form a Japanese character "ハ"). Specifically, the front ends of the tilt members 75 are joined to left and right intermediate portions laterally separated from a laterally intermediate portion of the rear cross member 74, and linearly tilt rearward and outward in the vehicle width direction so that the distance between the tilt members 75 increases toward the rear to couple the left and right intermediate portions to the third mount parts M3 as rear-end vehicle attachment parts of the left and right side members 6 (see FIGS. 2, 3, and 7).

As illustrated in FIGS. 1 through 6, the brace 80 includes a plurality of brace members 81, 82, and 83 described later disposed to constitute a plane substantially orthogonal to the vertical direction. The brace 80 is disposed below the pair of left and right side member rear portions 6b and 6b and the rear cross member 74 extending in the vehicle width direction ahead of the members 6b and 6b, and covers space that formed by the members 6b, 6b, and 74 and having a substantially U shape open to the rear in plan view.

Specifically, as illustrated in FIGS. 1 through 3 and 7, the brace 80 integrally includes the X-shaped member body 81 (X-shaped beam), the pair of left and right longitudinally extending members 82 and 82 (longitudinal beams), and the rear-end laterally extending member 83 (lateral beam).

The X-shaped member body 81 includes: one diagonally extending member 81a linearly coupling the left arm supporting part 71 to the third mount part M3 (rear vehicle body attachment part) of the right side member 6 diagonally disposed to the left arm supporting part 71 in plan view; and another diagonally extending member 81a linearly coupling the right arm supporting part 71 to the third mount part M3 (rear vehicle body attachment part) of the left side member 6 diagonally disposed to the right arm supporting part 71. These diagonally extending members 81a and 81a constituting a pair are crossed at the center to form an X shape in plan view (see FIGS. 3 and 7).

The longitudinally extending members 82 and 82 extend longitudinally at the left and right sides of the brace 80. That is, left and right longitudinally extending members 82 and 82 constituting a pair are disposed to linearly couple proximal ends 71a of the corresponding arm supporting parts 71 (laterally inner ends of the arm supporting parts 71) (see FIGS. 3 and 7) to the rear vehicle body attachment parts (third mount parts M3) of the side members 6.

In the manner described above, the proximal ends 71a of the arm supporting parts 71 are displaced to the inside in the vehicle width direction relative to the joint portions of the rear cross member 74 to the side members 6 in the vehicle width direction. The proximal ends 71a of the arm supporting parts 71 are coupled to the front ends of the left and right longitudinally extending members 82 and 82. The brace 80 is disposed in such a manner that the pair of left and right longitudinally extending members 82 and 82 gradually tilt inward in the vehicle width direction and toward the front side of the longitudinal direction in which the side members 6 extend (see FIG. 3).

As illustrated in FIGS. 1 through 3 and 7, the rear-end laterally extending member 83 extends in the vehicle width direction at the rear end of the brace 80. That is, the rear-end laterally extending member 83 extends to linearly couple the third mount parts M3 of the left and right side members 6 and 6 to each other.

The X-shaped member body 81, the pair of left and right longitudinally extending members 82 and 82, and the rear-end laterally extending member 83 are integrally joined together and form a brace face. Thus, the assembly of the members forming a triangular shape (truss shape) in plan view can be disposed on a place constituting the brace face (see the same drawings).

Although the brace 80 according to this embodiment does not include a front-end laterally extending member that extends in the vehicle width direction at the front end of the brace 80, but may include additional members as appropriate.

As described above, the brace 80 and the tilt members 75 are coupled to the rear cross member 74 and the pair of left and right side members 6 and 6, respectively, and also as illustrated in FIG. 3, intermediate coupling parts 91 are provided to couple the brace 80 and an intermediate part between the tilt members 75. In this embodiment, the intermediate connecting part 91 couples a front part of the diagonally extending member 81a of the brace 80 with a front part of the tilt member 75.

The front sub-frame 5 according to this embodiment is constituted by the left and right side member rear portions 6b and 6b and the rear cross member 74 to form a substantially U shape that is open at the rear in plan view. Above this substantially U-shaped inner space open to the rear in plan view, a longitudinal engine (not shown) in which crank shafts are arranged in the longitudinal direction is disposed. Thus, as illustrated in FIGS. 1 through 7, engine mount brackets 72 for mounting the longitudinal engine are disposed at corners between the left and right side member rear portions 6b and 6b and the rear cross member 74.

The engine mount brackets 72 are integrally joined by welding to each of the rear cross member 74, the tilt members 75, and the side members 6. That is, these members 6, 74, and 75 are coupled to each other through the engine mount brackets 72.

The above-described front sub-frame structure of this embodiment is a front sub-frame structure of an automobile, wherein the pair of left and right front side frames 2 and 2 extending from the cabin front face part toward the vehicle front side are provided, and a front sub-frame 5 supporting a front suspension device is provided below the front side frames 2 and 2. In the sub-frame front structure 10 provided in the front part of the front sub-frame 5, provided are the sub-crash can attachment part 12 disposed so as to face the sub-crash can 7 from the rear bracket 7b, and the tension rod supporting part 14 provided with the substantially U-shaped tension rod supporting bracket 40 that extending in the outwardly rear direction in the vehicle width direction. The front vehicle body attachment part 13 is provided between the two parts 12 and 14. The sus-cross member 73 facing the front vehicle body attachment part 13 and the tension rod supporting part 14 from the inside in the vehicle width direction is provided. The front vehicle body attachment part 13 includes the sub-crash can load transferring member 30 installed between the rear face of the sub-crash can attachment part 12 and the front wall face 41 of the tension rod supporting part 14. The upper face portion 21 of the front vehicle body attachment part 13 and the partition wall 33 of the sub-crash can load transferring member 30 are spaced apart in the vertical direction and extend in the longitudinal direction of the vehicle (see FIGS. 4, 7, 9A, and 12A).

According to the above configuration, the front vehicle body attachment part 13 and the sub-crush can load transmitting member 30, which are provided at the front portion of the front sub-frame 5, are formed of a plate material such as a steel plate. In addition, the upper face portion 21 of the front vehicle body attachment part 13 and the partition wall 33 of the sub-crash can load transferring member 30 are spaced apart in the vertical direction and extend in the longitudinal direction of the vehicle, in other words, the upper face portion 21 and the partition wall 33 have a so-called two-storied structure. Thus, the cost and weight of the front sub-frame 5 can be reduced, whereas the support stiffness of the tension rod 51 and the attaching stiffness of the sub-crash can 7 can be increased.

Further, in the above-described structure in which the upper face portion 21 of the front vehicle body attachment part 13 and the partition wall 33 of the sub-crash can load transferring member 30 are spaced apart in the vertical direction and extend in the longitudinal direction of the vehicle, the tension rod supporting part 14 is provided to face toward the outwardly rear direction in the vehicle width direction such that the space is formed between the tension rod supporting part 14 and the sub-crash can 7. Thus, the front part of the front sub-frame 5 can be reinforced, and a compact layout with that space can be provided.

In addition, the front vehicle body attachment part 13 is provided by taking advantage of the space generated between the sub-crash can 7 and the tension rod supporting part 14 provided so as to face toward the outwardly rear direction in the vehicle width direction. The front vehicle body attachment part 13 can compactly face the sus-cross member 73 in the vehicle width direction and the sub-crush can 7 in the longitudinal direction.

Here, the layout of the tension rod supporting part 14 and the sub-crash can 7 and the load transmission to the rear of the vehicle will be described in detail. The tension rod supporting part 14 is provided in a substantially U-shape to face toward the outwardly rear direction in the vehicle width direction to support the tension rod 51 extending toward the outwardly rear direction in the vehicle width direction. Thus, between the front wall face 41 of the tension rod supporting part 14 and the rear face of the sub-crash can attachment part 12, a space having a substantially triangular or substantially trapezoidal shape in plan view is formed (a substantially trapezoidal shape in this embodiment as illustrated in FIGS. 3 and 7).

The front vehicle body attachment part 13 disposed in the space therebetween needs to be reinforced to receive the front collision load transmitted from the sub-crash can 7. Thus, the upper face portion 21 (the upper panel) of the front vehicle body attachment part 13 and the partition wall 33 of the sub-crash can load transferring member 30 have the above-described structure in which the two part are spaced apart in the vertical direction and extending in the longitudinal direction of the vehicle. Thus, the above-described space can be provided in a compact layout. In addition, even if the sub-crash can 7 is provided in a low position, the load can be transmitted from the sub-crash can attachment part 12 toward the vehicle body (the front side frame 2), or toward the tension rod supporting part 14 arranged above so as not to interfere with the steering rack 55, i.e., toward the rear of the front sub-frame 5

That is, according to the above configuration, the space formed between the rear bracket 7b of the sub-crash can 7 and the front wall face 41 of the tension rod supporting part 14 can be advantageously used such that the front vehicle body attachment part 13 can be provided in a compact layout and also can be reinforced.

Moreover, in this embodiment, the front vehicle body attachment part 13 has the structure in which the upper face portion 21 and the partition wall 33 are vertically coupled by the mount pipe 34, and the upper face portion 21 and the partition wall 33 are spaced apart in the vertical direction and extend in the longitudinal direction of the vehicle (See FIGS. 4, 9A, and 12B). Thus, the front vehicle body attachment part 13 can be further reinforced, the load transmission in the longitudinal direction can be properly performed.

In other words, even if the front vehicle body attachment part 13 has the structure in which the upper face portion 21 and the partition wall 33 are spaced apart in the vertical direction and extend in the vehicle longitudinal direction so that the sub-crash can 7 is arranged in a low position, the load can be efficiently transmitted from the sub-crash can attachment part 12 to the tension rod supporting part 14. Thus, the sub-crush can 7 can be disposed in a low position, and the sub-crash can 7 together with the crush can 4 can properly absorb the energy generated by the front collision load.

The front vehicle body attachment part 13 is disposed in a substantially triangular or substantially trapezoidal shape in plan view between the sub-crash can attachment part 12 and the front wall face 41 of the tension rod supporting part 14. Thus, the tension rod supporting part 14 can be provided in a substantially U-shape corresponding to the direction in which the tension rod 51 determining the position of the front wheel in the longitudinal direction extends in the outwardly rear direction in the vehicle width direction. Thus, a wasteful space is not generated in the front part of the front sub-frame 5, and the tension rod supporting part 14 can properly support the tension rod 51.

Moreover, the front vehicle body attachment part 13 is attached to the front side frame 2 via the mount pipe 34, and the sus-cross member 73 facing the front vehicle body attachment part 13 and the tension rod supporting part 14 from the inside in the vehicle width direction is provided. Thus, the load applied to the tension rod 51 and the collision load applied to the sub-crash can 7 can be efficiently transmitted to the sus-cross member 73 and the front side frame 2.

The front vehicle body attachment part 13 has a structure in which the upper face portion 21 and the sub-crash can load transferring member 30, both of which are in a panel-like shape, are combined so that the upper face portion 21 and the partition wall 33 of the sub-crash can load transferring member 30 are spaced apart in the vertical direction and extend in the longitudinal direction of the vehicle. Thus, for example, a weight reduction can be done in comparison with a casting requiring a complicated mold, and also a manufacturing cost can be reduced. Thus, a high stiffness structure can be made.

As an aspect of the technique disclosed in this specification, the sub-crash can load transferring member 30 has a bottom opening shape and includes at least the partition wall 33 vertically dividing the inner space of the front vehicle body attachment part 13, and the outer face 31 disposed outside in the vehicle width direction (see FIGS. 7, 9A, 11A, and 12 A). The partition wall 33 and the outer face 31 are arranged along the outer shell of the sub-crash can 7, and the outer face 31 includes the service hole 31a (see FIGS. 1, 4, 7, 8, 9A, 11A, and 12A).

According to the above configuration, both the assembling property of the front vehicle body attachment part 13 and the sub-crash can load transferring member 30 and the efficiency of load distribution toward the vehicle body (the front side frame 2) and the tension rod supporting part 14 (the front sub-frame 5) can be improved.

Here, considering the load transferability from the sub-crash can attachment part 12 to the tension rod supporting part 14, the load is preferably properly transferred not only the rear side but also the upper side of the front vehicle body attachment part 13.

That is, as described above, the front vehicle body attachment part 13 has the two-storied structure with the upper face portion 21 and the partition wall 33 to properly reinforce the strength of the upper portion of the front vehicle body attachment part 13, whereas the sub-crash can load transferring member 30 has a bottom opening shape, and the outer face 31 includes the service hole 31a. Thus, the lower part of the front vehicle body attachment part 13 is intentionally weakened relative to the upper part.

Thus, the front vehicle body attachment part 13 can efficiently transmit the load from the sub-crash can 7 to the front side frame 2 attached at the first mount part M1 thereabove via the mount pipe 34, and the tension rod supporting part 14 disposed in an offset manner above with respect to the sub-crash can 7.

The partition wall 33 and the outer face 31 provided on the sub-crash can load transferring member 30 are arranged along the outer shell (the shape of the outer face of the perpendicular cross-section in the longitudinal direction) of the sub-crash can 7. That is, in this embodiment, in a state in which the rear bracket 7b of the sub-crash can 7 and the sub-crash can attachment part 12 face each other, the upper face 7f constituting the outer shell of the sub-crash can 7, the outer face 7e on the outside in the vehicle width direction, and the inner face 7g on the inside in the vehicle width direction are substantially coincidentally flush with the partition wall 33, the outer face 31, and the inner face 32 of the sub-crash can load transferring member 30 in the vehicle width direction and the vertical direction, respectively. Thus, the load can be efficiently transferred from the sub-crash can 7 to the front vehicle body attachment part 13 via the rear bracket 7b and the sub-crash can attachment part 12.

As an aspect of the technique disclosed in this specification, the recess A, which is opened downward, for storing the steering rack 55 and the stabilizer 100 is formed on the rear side of the tension rod supporting part 14 and under the side member 6 (see FIGS. 4, 7, and 10).

According to the above configuration, both a compact space for disposing the tension rod 51, the stabilizer 100, the steering rack 55 and so forth and the assembling property of the stabilizer 100 toward the rear of the tension rod supporting part 14 can be achieved.

Specifically, on the rear side of the tension rod supporting part 14 and below the side member 6 such as immediately below the closed-section coupling part 15, the recess A, which is opened downward, for storing the steering rack 55 is formed. This recess A stores the stabilizer 100 in addition to the steering rack 55 such that the wasteful layout and compactness can be achieved.

Moreover, immediately below the closed-section coupling part 15, the recess A which is opened downward is formed. Thus, it is easy to attach the stabilizer 100 to the lower face of the closed-section coupling part 15, and the assembling property can be improved.

To satisfy the need for arranging the sub-crash can 7 as low as possible and the need for arranging the steering rack 55 below the side member 6, the front sub-frame 5 of this embodiment includes the recess A, which is opened downward for storing the steering rack 55, on the rear side of the tension rod supporting part 14 and below the side member 6, i.e., below the closed-section coupling part 15.

By using the space on the front side of the storage space of the steering rack 55 in the recess A, the stabilizer 100 is fastened to the lower face of the closed-section coupling part 15, such that the stabilizer support part 62 and the steering rack 55 can be disposed in the longitudinal direction in the recess A, and the compact configuration can be achieved.

Further, by disposing the stabilizer support part 62 in the recess A, the stabilizer 100 and the tension rod 51 can be disposed so as to overlap in the vehicle width direction, and the compact configuration in the vertical direction can be achieved.

The front sub-frame 5 of this embodiment includes the recess A for storing the steering rack 55 and the stabilizer 100 below the closed-section coupling part 15 extending rearward from the rear wall face 42 of the tension rod supporting part 14. Further, the side member 6 extends rearward from the rear end of the closed-section coupling part 15 in a position offset upward with respect to the position of the sub-crush can 7. Thus, the collision load transmitted from the sub-crash can 7 needs to be transmitted from the upper part to the rear part of the recess A.

In such a configuration, as described above, the upper part of the front vehicle body attachment part 13 is reinforced as the structure in which the upper face portion 21 and the partition wall 33 of the sub-crash can load transferring member 30 are spaced apart in the vertical direction and extend in the longitudinal direction of the vehicle. The lower part of the front vehicle body attachment part 13 is intentionally and relatively weakened relative to the upper part by forming the lower opening shape and forming the service hall 31a in the outer face 31.

Thus, even if the recess A is provided on the rear side of the tension rod supporting part 14, the collision load transmitted from the sub-crash can 7 can be efficiently transmitted to the side member 6 from the closed-section coupling part 15 extending rearward above the recess A from the rear side of the tension rod supporting part 14.

Furthermore, the recess A stores the stabilizer 100 and the steering rack 55 in parallel in the longitudinal direction. Thus, even if, at the time of a front collision, in the front sub-frame 5 as the load path, the closed-section coupling part 15 is bent and deformed so that the recess A is crushed, the stabilizer 100 and the steering rack 55 stored in the recess A can disperse the front collision load the rear side of the recess A. Thus, the load path can be increased.

Moreover, when the closed-section coupling part 15 is bent and deformed by the front collision load, the stabilizer 100 and the steering rack 55 stored on the front and rear sides of the recess A interfere with each other. Thus, it is possible to prevent the front sub-frame 5 from being bent at a stroke in a perpendicular direction with respect to the closed-section coupling part 15 as a fulcrum.

Thus, the sub-crash can 7 can be crushed properly against the front collision load to absorb the collision energy, and the inhibition of the smooth load transmission toward the vehicle body can be reduced.

On the rear side of the sub-frame front structure 10, a recess Z, for attaching the tension rod 51, recessed inward in the vehicle width direction with respect to the position of the tension rod supporting part 14 in the vehicle width direction is formed (see FIG. 2). In other words, the side member 6 is also offset inward in the vehicle width direction with respect to the sub-crash can 7.

Thus, the side member 6 can be arranged so as not to interfere with the tension rod 51 even if the end of the tension rod 51 swings vertically. Moreover, if the side member 6 is also offset inward in the vehicle width direction with respect to the sub-crash can 7, the collision load transmitted from the sub-crash can 7 is offset inward in the vehicle width direction to be transmitted when transmitted to the side member 6 through the sub-frame front structure 10. Thus, the load is likely to concentrate outward in the vehicle width direction on the front vehicle body attachment part 13 having a part before the load is transmitted and offset inward in the vehicle width direction.

However, in this embodiment, the service hole 31a is provided on the outer face 31 of the front vehicle body attachment part 13 such that it is possible to alleviate the concentration of the load toward the outside in the vehicle width direction. Note that as described above, the upper part of the front vehicle body attachment part 13 is preferably weakened than the lower part thereof. Thus, the service hole 31a is preferably provided in, particularly the lower part of the outer face 31 in the vehicle width direction.

The front sub-frame 5 of this embodiment has a structure in which a vertically mounted engine (not shown) including the crankshafts arranged in the longitudinal direction is mounted via the engine mount bracket 72 at the upper rear portion thereof. Thus it is difficult to arrange and lay out a cross member such as a sus-cross member between the pair of left and right side member rear portions 6b, 6b.

Thus, the front sub-frame 5 of this embodiment includes the sus-cross member 73 extending in the vehicle width direction and the sub-frame front structure 10 having the tension rod supporting part 14, in the front of the side member 6. However, in that case, the stress is likely to concentrate on the sub-frame front structure 10 and the shape thereof is likely to be complicated disadvantageously because the sus-cross member 73 is joined to the laterally inner wall face 43 from the inside in the vehicle width direction, and the sub-crash can attachment part 12 and the tension rod supporting part 14 are provided. However, as described above, the front sub-frame 5 of this embodiment ensures the formability (the assembling property) because the sub-frame front structure 10 is made of a plate material. The front sub-frame 5 also has the above-described structure (the so-called two-storied structure) in which the upper face part 21 and the partition wall 33 are spaced apart in the vertical direction and extend in the longitudinal direction of the vehicle to ensure the support stiffness of the sub-crash can 7 and the tension rod 51.

In the front sub-frame structure of this embodiment, the tension rod supporting part 14 is provided at the front part of the front sub-frame 5, the side member 6 is extended rearward from the tension rod supporting part 14, the recess A opened downward for arranging a rack (arranging the steering rack 55) is formed behind the tension rod supporting portion 14 and under the side member 6, and the stabilizer support part 62 is provided in the recess A (see FIGS. 3, 4, and 10).

According to the above configuration, the stabilizer support part 62 is arranged in the recess A for arranging a rack. Thus, in the suspension of a tension rod type, the support stiffness of the tension rod 51 and the attaching stiffness of the sub-crash can 7 can be increased, and the tension rod supporting part 14, the stabilizer support part 62, and the steering rack 55 can be arranged so as to overlap in the vertical direction along the vehicle longitudinal direction. Thus, the compact configuration can be achieved in the vertical direction.

Specifically, the stabilizer support part 62 is formed by fastening, by the bolt B, the stabilizer attaching bracket 60, which is a separate member, to the lower face of the closed-section coupling part 15 having the recess A thereabove (see FIGS. 3 and 10). Thus, the coupling stiffness of the closed-section coupling part 15 coupling the tension rod supporting part 14 and the side member 6 can be increased, and as a result, the supporting stiffness of the tension rod 51 and the attaching stiffness of the sub-crush can 7 can be increased.

Moreover, the steering rack 55 is arranged in the recess A behind the tension rod supporting part 14 and below the side member 6 (FIGS. 3, 4 and 10). Thus, the recess A, which is originally a dead space, can be effectively used. Further, the stabilizer support part 62 is also disposed in the recess A in which the steering rack 55 is disposed. Thus, the space of the recess A can be more effectively used.

In addition, the recess A is formed behind the tension rod supporting part 14 (see the same drawings). Thus, as described above, by providing the stabilizer support part 62 in the recess A, the stabilizer 100 can be disposed at a position in which the stabilizer 100 overlaps the tension rod 51 in the vertical direction. Thus, the compact configuration can be achieved in the vertical direction.

Further, the above-described effective use of the space of the recess A will be described in detail. The position of the arm supporting parts 71 is determined to obtain a desired behavior of the suspension. In the configuration in which the arm supporting part 71 is disposed behind the steering rack 55, the side member 6 is arranged and laid out in the front and rear at the substantially same height (the vertical same position) as those of the steering rack 55 and the arm supporting part 71. Thus, it is difficult to linearly arrange the side member 6. In addition, if the side member 6 is arranged to vary up and down to bypass the steering rack 55 and the arm supporting part 71, an unreasonable load is likely to be applied in the middle during the load transmission.

Thus, as countermeasures, the side member 6 is disposed so that the front part thereof is offset upward with respect to the steering rack 55 and the arm supporting part 71 and the rear part thereof is extended obliquely downward. Thus, the restriction of the layout is eliminated, and a bent part is reduced such that no excessive load is applied in the middle of the side member 6 (see FIG. 4).

That is, the front sub-frame 5 of this embodiment has a configuration in which the side member 6 is offset upward with respect to the lower arm 52 including the arm supporting part 71 and the steering rack 55 and arranged in the longitudinal direction such that the load from the sub-crash can 7 is collected temporarily in the upper part of the side member 6, and then transmitted from the front part of the side member 6 to the rear part.

In this manner, the side member 6 is offset upward, and thus the recess A is formed behind the tension rod supporting part 14 and below the side member 6. In this embodiment, as described above, the recess A, which is originally likely to be a dead space, is used as the recess A for arranging a rack (arranging the steering rack 55), and moreover, the stabilizer support part 62 is also disposed in the recess A. Thus, the space of the recess A can be effectively used.

As an aspect of the technique disclosed in this specification, the sub-crash can attachment part 12 is provided in front of the tension rod supporting part 14 (see FIGS. 1 through 4 and 7). In addition, between the rear wall face 42 of the tension rod supporting part 14 and the front part of the side member 6, the closed-section coupling part 15 having a closed-section extending in the longitudinal direction and coupling them is provided (see FIGS. 9A and 10). In addition, the stabilizer support part 62 is fastened so as to connect the upper and lower faces of the closed-section coupling part 15 (see FIG. 10).

According to the above configuration, between the rear wall face 42 of the tension rod supporting part 14 and the front part of the side member 6, the closed-section coupling part 15 having a closed-section extending in the longitudinal direction is provided. Thus, even if the sub-frame front structure 10 is formed of a plate material such as a steel plate, the strength thereof can be increased. Moreover, the stabilizer support part 62 is configured to fasten the stabilizer 100 via the stabilizer attachment bracket 60 and with the bolt B and the nut so as to couple the upper and lower faces of the closed-section coupling part 15. Thus, the strength between the rear wall face 42 of the tension rod supporting part 14 and the front part of the side member 6 can be further increased in the longitudinal direction.

Moreover, the recess A is opened downward (see FIGS. 4 and 10). Thus, even if the stabilizer support part 62 is fastened so as to couple the upper and lower faces of the closed-section coupling part 15 provided above the recess A, it is easy to fasten the stabilizer attaching bracket 60 to the closed-section coupling part 15, and the excellent assembling property between the stabilizer 100 and the closed-section coupling part 15 can be ensured.

Thus, according to the above configuration, both the assembling property of the stabilizer 100 to the closed-section coupling part 15 and the reinforcement of the closed-section coupling part 15 in the longitudinal direction by the stabilizer support part 62 can be achieved.

As an aspect of the technique disclosed in this specification, the stabilizer support part 62 is disposed to be sandwiched between the rear wall face 42 of the tension rod supporting part 14 and the steering rack 55 (see FIGS. 4 and 10).

According to the above configuration, when, for example, the closed-section coupling part 15 near the recess A is bent and deformed by the front collision load, the load can be dispersed backward by the stabilizer support part 62 and the steering rack 55 disposed in the recess A.

Specifically, in the recess A, the stabilizer support part 62 and the steering rack 55 are arranged substantially in parallel in the longitudinal direction. Thus, even if, at the time of a front collision causing a load, the front sub-frame 5 is forced to bend so that the recess A is crushed with respect to the closed-section coupling part 15 as a fulcrum above the recess A, the stabilizer 100 and the steering rack 55 interfere with each other such that it is possible to prevent the front sub-frame 5 from being bent at a stroke in a perpendicular direction.

Thus, the sub-crash can 7 can be crushed properly against the front collision load to absorb the collision energy, and the inhibition of the smooth load transmission toward the vehicle body can be reduced.

In this embodiment, the pair of tension rod supporting holes 41a, 41a, the through holes 15a, 15b (the stabilizer support holes), and the side member 6 are disposed substantially in series in the vehicle longitudinal direction (see FIGS. 3, 8, 9A, and 9B).

In other words, in this embodiment, the tension rod support shaft 44, the front stabilizer fastening part 63a, the rear stabilizer fastening part 63b, and the side member 6 are disposed substantially in series in the vehicle longitudinal direction (see the same drawings).

According to the above configuration, the offset amount in the vehicle width direction of the load path from the tension rod supporting part 14 to the side member 6 via the closed-section coupling part 15 is reduced as much as possible so that the front collision load can be transmitted along the high stiffness portion between the tension rod supporting part 14 and the side member 6 in the vehicle longitudinal direction. Thus, the front sub-frame 5 of this embodiment has the configuration in which the recess A is provided behind the tension rod supporting part 14 and under the side member 6, whereas the stiffness against the front collision can be improved.

Furthermore, in this embodiment, the left and right tension rod supporting parts 14 and 14 are coupled to the sus-cross member 73, and the tension rod supporting part 14 is inclined rearward and outward (see FIGS. 1, 3 and 7). The stabilizer support part 62 is adjacent to the rear of the tension rod supporting part 14, and the stabilizer 100 is disposed along the laterally inner wall face 43 of the tension rod supporting part 14 and the sus-cross member 73 (See FIGS. 1 through 4).

According to the above configuration, the stabilizer 100 is provided so as to gradually tilt forward from the stabilizer support part 62 adjacent to the rear of the tension rod supporting part 14 and toward the inner side in the vehicle width direction along the wall face 43 of the tension rod supporting part 14 and the sus-cross member 73. Thus, the installation space for the power steering actuator 56 and the power steering pinion 57 provided in the steering rack 55 can be secured, the layout property can be increased, and the stiffness of the inclined part of the stabilizer 100 in the longitudinal direction can be secured.

Further, the stabilizer 100 extending in the vehicle width direction includes a recessed passing part passing through the recess A, the recessed passing part extending linearly (horizontally) in the vehicle width direction (see FIGS. 3 and 4), and the stabilizer support part 62 is disposed in the recess A wherein the recessed passing part of the stabilizer 100 is supported on the closed-section coupling part 15 via the stabilizer attaching bracket 60 (see FIGS. 4 and 10).

As such, the recessed passing part of the stabilizer 100 does not have a component in the longitudinal direction, and thus the stiffness in the longitudinal direction is likely to be lower compared with the case where the recessed passing part have such a component. However, the stabilizer support part 62 is fastened to the lower face of the closed-section coupling part 15 via the stabilizer attaching bracket 60 so that the stabilizer fastening parts 63a, 63b are arranged in the front and rear side. Thus, the stiffness in the longitudinal direction including the recessed passing part of the stabilizer 100 can be improved.

As described above, the front sub-frame structure according to this embodiment includes: the rear cross member 74 coupling the arm supporting parts 71 and 71 supported by the left and right side members 6 and 6 of the front sub-frame 5 (see FIGS. 1 through 8); the tilt members 75 coupling the laterally separated left and right intermediate portions of the rear cross member 74 to the third mount parts M3 (rear vehicle body attachment parts) on the rear portions of the side members 6 and 6 (see FIGS. 1 through 4, 6, and 7); the brace 80 coupling the left and right arm supporting parts 71 and 71 to the third mount parts M3 diagonally disposed to the arm supporting parts 71 and 71; and the intermediate coupling parts 91 coupling the brace 80 to the intermediate portions of the tilt members 75 (see FIG. 3).

This configuration includes the intermediate coupling parts 91 coupling, to the brace 80, the tilt members 75 extending rearward and tilting outward in the vehicle width direction from the laterally separated left and right intermediate portions of the rear cross member 74 to the third mount parts M3 on the rear portions of the side members 6 and 6 at the left and right of the rear portion of the front sub-frame 5. Thus, even in a case where the brace 80 is thin, the brace 80 can effectively achieve functions as the brace 80.

Specifically, the side members 6, the lower arms 52 (lateral links), and the tension rods 51 are disposed to form triangles in plan view below a front portion of the front sub-frame 5. On the other hand, since there is a request for minimizing the height of the engine in order to lower the barycenter of the vehicle, this embodiment employs the longitudinal engine (not shown) in which crank shafts are arranged in the longitudinal direction, and the engine is disposed in a rear portion of the front sub-frame 5 where the lower arms 52 and the tension rods 51, for example, are not disposed.

On the other hand, the rear portion of the front sub-frame 5 has the frame structure with a trapezoidal shape in plan view constituted by the rear cross member 74 coupled to the left and right arm supporting parts 71 and the left and right side member rear portions 6b and 6b extending rearward. If the engine is mounted on the rear portion with such low stiffness, it might be difficult to maintain support stiffness in traveling.

In particular, in the case of mounting the longitudinal engine described above, there might be difficulty in obtaining engine support stiffness because of a reaction force in wheels rotating with driving of the engine in pressing an accelerator.

In such a case, low engine support stiffness might adversely affect responsiveness in steering the steering wheel, and thus, stiffness of the vehicle needs to be increased in traveling, especially in turning. The configuration in which the engine is disposed in the rear portion of the front sub-frame 5 also has an issue of obtaining engine support stiffness.

In view of this issue, in this embodiment, the tilt members 75 are disposed in the rear portion of the front sub-frame 5 to couple the laterally separated left and right intermediate portions of the rear cross member 74 to the third mount parts M3 of the side member rear portions 6b and 6b, and the tilt members 75 are coupled to the brace 80 by the intermediate coupling parts 91. Thus, even in the case where the engine is mounted in the rear portion of the front sub-frame 5, engine support stiffness can be maintained.

Specifically, if the rear portion of the front sub-frame 5 were reinforced only by the brace 80 without using the tilt members 75, the brace 80, which is thin itself, might fluctuate vertically and fail to receive a load. On the other hand, in this embodiment, the tilt members 75 having high stiffness are provided, and the tilt members 75 and the brace 80 are coupled with each other by the intermediate coupling parts 91. Thus, integration of these members is enhanced so that the tilt members 75 can reinforce the brace 80, and the tilt members 75 and the plurality of members 81 (81a and 81a), 82, and 83 constituting the brace 80 can form a plurality of truss structures in plan view in the rear portion of the front sub-frame 5. Accordingly, the tilt members 75 restrict deformation of substantially trapezoidal shapes in plan view constituted by the left and right side members 6 and 6 and the rear cross member 74 extending in the vehicle width direction to a rhombus shape such as a parallelogram in plan, and in addition, can restrict vertical deformation of the brace 80 so that functions as the brace 80 can be enhanced.

That is, a synergistic effect of the tilt members 75 and the brace 80 can enhance engine support stiffness of the rear portion of the front sub-frame 5.

In addition, although not shown, when the brace 80 is attached to the upper face of an undercover with, for example, a fastener, this brace 80 can also function as a reinforcing member for the undercover. The undercover is a cover for covering the front sub-frame 5 under the vehicle floor in order to improve aerodynamic characteristics or avoid a reduction in the traction performance caused by reduction in the stiffness of the suspension during traveling.

In the manner described above, the brace 80 is disposed as a reinforcing member for the undercover so that the undercover can be reinforced and the panel-shaped undercover itself can be made thin so that the vehicle weight can be reduced.

In an aspect of the technique disclosed in this specification, the rear cross member 74, the tilt members 75, and the side members 6 are coupled to each other by the welding engine mount brackets 72 (see FIGS. 1, 2, and 6).

With this configuration, the left and right engine mount brackets 72 are coupled to the rear cross member 74, the tilt members 75 and the side members 6, and thus engine support stiffness by the left and right engine mount brackets 72 can be enhanced. In this manner, no additional engine supporting structure needs to be provided in a lateral center portion, and the engine can be disposed at a low height so that the vehicle barycenter can be lowered, and a roll and traction can be improved. In addition, integration of the rear cross member 74, the tilt members 75, and the side members 6 can be enhanced, and thus, suspension support stiffness as well as engine support stiffness can be increased.

In an aspect of the technique disclosed in this specification, the brace 80 includes the left, right, and rear brace members 82, 82, and 83 (see FIGS. 1 through 3 and 7).

With this configuration, the brace 80 itself is configured to include a plurality of truss shapes by using the X-shaped member bodies 81 crossing each other, the left and right longitudinally extending members 82 and 82, and the rear-end laterally extending member 83. Accordingly, the number of truss structures can be increased so that stiffness can be enhanced.

In an aspect of the technique disclosed in this specification, the brace 80 according to this embodiment includes the left and right longitudinally extending members 82 and 82, and the rear ends of the longitudinally extending members 82 and 82 are coupled to the rear portions of the side members 6 provided with the third mount parts M3. The longitudinally extending members 82 and 82 extend forward and gradually tilt inward in the vehicle width direction. The front ends of the longitudinally extending members 82 and 82 are coupled to the proximal ends 71a of the arm supporting parts 71 (see FIG. 3).

That is, the longitudinally extending members 82 and 82 are disposed in such a manner that front portions of the members 82 tilt inward in the vehicle width direction relative the side members 6. In this manner, the brace 80 can form truss structures by using the longitudinally extending members 82, the side members 6, and the rear cross member 74 at the left and right sides, and also by using the longitudinally extending members 82, the tilt members 75, and the diagonally extending members 81a. As a result, stiffness can be further increased.

The correspondences between the configuration of the technique disclosed in this specification and the above-described embodiment will be described. The rear face of the sub-crash can attachment part corresponds to the rear bracket 7b of the sub-crash can 7. Similarly, the upper wall of the front vehicle body attachment part corresponds to the upper face portion 21. The upper wall of the sub-crash can load transferring member corresponds to the partition wall 33. The front face of the tension rod supporting part corresponds to the front wall face 41 of the tension rod supporting bracket 40. The cross member corresponds to the sus-cross member 73. However, the technique disclosed in this specification is not limited to only the configuration of the above-described embodiment.

For example, as long as the above-described sub-crash can load transferring member 30 has a bottom opening shape with at least the partition wall 33 and the outer face 31, the inner face 32 may or may not have the configuration of the embodiment.

The existence of the main crush can such as the sub-crash can 7 in the front sub-frame 5 as shown in the above-described embodiment is not necessarily contained in the technique disclosed in this specification.

For example, clearly, an impact load absorbing part may be provided on the bumper reinforcement itself or the front side frame itself, i.e., can be applicable to a vehicle without a crash can in addition to the vehicle including the sub-crash can 7 of the embodiment.

INDUSTRIAL APPLICABILITY

As described above, the technique disclosed in the present specification is useful for the front sub-frame structure wherein, in the front part of the front sub-frame, provided are the sub-crash can attachment part disposed so as to face the sub-crash can from the rear, and the substantially U-shaped tension rod supporting part extending in the outwardly rear direction in the vehicle width direction; the front vehicle body attachment part is provided between the two parts; and the cross member facing the front vehicle body attachment part and the tension rod supporting part from the inside in the vehicle width direction is provided.

DESCRIPTION OF REFERENCE CHARACTERS (5) Front Sub-Frame
(6) Side Member
(7) Sub-Crash Can
(7b) Rear Bracket (Rear Face of Sub-Crash Can Attachment Part)
(12) Sub-Crash Can Attachment Part
(13) Front Vehicle Body Attachment Part
(14) Tension Rod Supporting Part
(21) Upper Face Portion (Upper Wall of Front Vehicle Body Attachment Part)
(30) Sub-Crash Can Load Transferring Member
(31) Outer Face
(31a) Service Hall
(33) Partition Wall (Upper Wall of Sub-Crash Can Load Transferring Member)
(41) Front Wall Face (Front Face of Tension Rod Supporting Part)
(55) Steering Rack
(73) Sus-Cross Member (Cross Member)
(100) Stabilizer
(A) Recess

The invention claimed is:

1. An automobile front sub-frame structure including a pair of left and right front side frames extending from a cabin front face toward a vehicle front, and a front sub-frame disposed below the front side frame and supporting a front suspension device, wherein
in a front part of the front sub-frame, provided are a sub-crash can attachment part disposed so as to face a sub-crash can from a rear, and a substantially U-shaped tension rod supporting part extending in an outwardly rear direction in a vehicle width direction,
a front vehicle body attachment part is provided between the two parts,
a cross member facing the front vehicle body attachment part and the tension rod supporting part from an inside in the vehicle width direction is provided, lateral ends of the cross member are coupled to laterally inner wall faces in left and right tension rod supporting parts from the inside in the vehicle width direction, the front vehicle body attachment part includes a sub-crash can load transferring member installed between a rear face of the sub-crash can attachment part and a front face of the tension rod supporting part, and an upper wall of the front vehicle body attachment part and an upper wall of the sub-crash can load transferring member are spaced apart and extend in a longitudinal direction of the vehicle.

2. The front sub-frame structure of claim 1, wherein the sub-crash can load transferring member has a bottom opening shape and includes at least a partition wall vertically dividing an inner space of the front vehicle body attachment part, and an outer face disposed outside in the vehicle width direction, the partition wall and the outer face are arranged along an outer shell of the sub-crash can, and the outer face includes a service hole.

3. The front sub-frame structure of claim 1, wherein a recess, which is opened downward, for storing a steering rack and a stabilizer is formed on a rear side of the tension rod supporting part and under a side member.

* * * * *